US012329196B2

(12) United States Patent
Emmett et al.

(10) Patent No.: US 12,329,196 B2
(45) Date of Patent: Jun. 17, 2025

(54) SHISHA SYSTEM WITH A HEATING UNIT COMPRISING TWO ELECTRODES

(71) Applicant: PHILIP MORRIS PRODUCTS S.A., Neuchatel (CH)

(72) Inventors: Robert Emmett, Neuchatel (CH); Ana Isabel Gonzalez Florez, St-Sulpice (CH)

(73) Assignee: Philip Morris Products S.A., Neuchatel (CH)

( * ) Notice: Subject to any disclaimer, the term of this patent is extended or adjusted under 35 U.S.C. 154(b) by 257 days.

(21) Appl. No.: 17/769,465

(22) PCT Filed: Sep. 29, 2020

(86) PCT No.: PCT/EP2020/077264

§ 371 (c)(1),
(2) Date: Apr. 15, 2022

(87) PCT Pub. No.: WO2021/073867

PCT Pub. Date: Apr. 22, 2021

(65) Prior Publication Data

US 2023/0087176 A1 Mar. 23, 2023

(30) Foreign Application Priority Data

Oct. 18, 2019 (EP) .................................... 19204201

(51) Int. Cl.
*A24F 40/46* (2020.01)
*A24D 1/20* (2020.01)
(Continued)

(52) U.S. Cl.
CPC .................. *A24F 1/30* (2013.01); *A24D 1/20* (2020.01); *A24F 40/20* (2020.01); *A24F 40/46* (2020.01); *H05B 6/54* (2013.01); *H05B 6/62* (2013.01)

(58) Field of Classification Search
CPC . A24F 1/30; A24F 40/20; A24F 40/46; A24D 1/20; A24D 1/14; H05B 6/54; H05B 6/62
See application file for complete search history.

(56) References Cited

U.S. PATENT DOCUMENTS 5,322,075 A * 6/1994 Deevi ..................... A24F 40/46
131/194
6,116,247 A * 9/2000 Banyasz ................ A24F 40/85
131/243
(Continued)

FOREIGN PATENT DOCUMENTS

CN 101277623 * 3/2011 ............. A24F 40/20
CN 103315405 9/2013
(Continued)

OTHER PUBLICATIONS

Communication issued in Europe for Application No. 19204201.8 dated Jul. 21, 2020 (9 pages).
(Continued)

*Primary Examiner* — Truc T Nguyen
(74) *Attorney, Agent, or Firm* — Mueting Raasch Group

(57) ABSTRACT

A shisha system comprising an aerosol-generating article (90) and a shisha device (50). The aerosol-generating article (90) comprises an aerosol-forming substrate (92). The shisha system further comprises a first electrode (15) and a second electrode (16). The shisha device (50) comprises a liquid cavity (54) configured to contain a volume of liquid, the liquid cavity (54) having a head space outlet (60); an article cavity (14) configured to receive an aerosol-forming substrate (92), the article cavity (14) being in fluid communication with the liquid cavity (54). The shisha device further comprises an oscillation circuit (10) configured for connection to the first electrode (15) and the second electrode (16). The oscillation circuit (10) is configured to supply a radio frequency (RF) alternating voltage to the first
(Continued)

electrode (15) and the second electrode (16), the RF voltage between the first electrode (15) and the second electrode (16) generating an alternating radio frequency (RF) electromagnetic field between the first electrode (15) and the second electrode (16) for heating the aerosol-forming substrate (92) when the aerosol-generating article (90) is received in the article cavity (14).

16 Claims, 10 Drawing Sheets

(51) Int. Cl.

| | |
|---|---|
| ***A24F 1/30*** | (2006.01) |
| ***A24F 40/20*** | (2020.01) |
| ***H05B 6/54*** | (2006.01) |
| ***H05B 6/62*** | (2006.01) |

(56) References Cited

U.S. PATENT DOCUMENTS

| | | | | |
|---|---|---|---|---|
| 9,179,710 | B2 * | 11/2015 | Chaoui | A24F 1/30 |
| 10,219,544 | B2 * | 3/2019 | Sparklin | H05B 6/802 |
| 12,016,391 | B2 | 6/2024 | Reevell | |
| 2006/0107964 | A1 * | 5/2006 | Ohanesian | A24F 1/30 131/330 |
| 2010/0326453 | A1 * | 12/2010 | Chaoui | A24F 1/30 131/173 |
| 2013/0037041 | A1 * | 2/2013 | Worm | A24F 40/46 131/329 |
| 2013/0319438 | A1 * | 12/2013 | Liu | A24F 40/485 131/329 |
| 2014/0069446 | A1 * | 3/2014 | Haddad | A24F 1/30 427/2.14 |
| 2014/0182606 | A1 * | 7/2014 | Lotringer | A24F 1/30 131/173 |
| 2014/0196716 | A1 * | 7/2014 | Liu | A24F 40/46 128/202.21 |
| 2014/0261408 | A1 * | 9/2014 | DePiano | A24F 40/46 128/202.21 |
| 2016/0192709 | A1 | 7/2016 | Liu | |
| 2017/0099873 | A1 | 4/2017 | Benjamignan | |
| 2017/0251718 | A1 * | 9/2017 | Armoush | A24F 40/40 |
| 2017/0265521 | A1 | 9/2017 | Do | |
| 2018/0271150 | A1 | 9/2018 | Sparklin | |
| 2019/0037925 | A1 | 2/2019 | Hon | |
| 2024/0245108 | A1 | 7/2024 | Hagen | |

FOREIGN PATENT DOCUMENTS

| | | |
|---|---|---|
| CN | 109195460 | 1/2019 |
| CN | 110248561 | 9/2019 |
| CN | 110279152 | 9/2019 |
| CN | 110652038 | 1/2020 |
| EP | 2480047 | 7/2012 |
| EP | 3216357 | 9/2017 |
| EP | 3747289 | 12/2020 |
| WO | WO 2017/143515 | 8/2017 |
| WO | WO 2019/069160 | 4/2019 |
| WO | WO 2020/044179 | 3/2020 |
| WO | WO 2021/013477 | 1/2021 |
| WO | WO 2021/043774 | 3/2021 |

OTHER PUBLICATIONS

PCT Search Report and Written Opinion for Application No. PCT/EP2020/077264 dated Nov. 3, 2020 (13 pages).

Office Action issued in Japan for Application No. 2022-523058 dated Sep. 9, 2024 (7 pages). English translation included.

Office Action issued in the United Arab Emirates for Application No. P6000665/2022 dated Nov. 26, 2024 (8 pages).

Office Action issued in China for Application No. 202080072533.4 dated Apr. 17, 2025 (34 pages). English translation included.

* cited by examiner (b)

(a)

SHISHA SYSTEM WITH A HEATING UNIT COMPRISING TWO ELECTRODES

This application is a U.S. National Stage Application of International Application No. PCT/EP2020/077264 filed Sep. 29, 2020, which was published in English on Apr. 22, 2021, as International Publication No. WO 2021/073867 A1. International Application No. PCT/EP2020/077264 claims priority to European Application No. 19204201.8 filed Oct. 18, 2019.

This disclosure relates to a shisha system for generating an aerosol from an aerosol-forming substrate. In particular, this disclosure relates to a shisha system, a shisha device and a shisha article for use with a shisha device.

Traditional shisha devices are sometimes referred to in the art as a hookahs, qalyan, narghiles or water pipes. Traditional shisha devices are different to other aerosol-generating devices, in that volatile compounds released from a heated substrate in a shisha device are drawn through a liquid basin before inhalation by a user. Traditional shisha devices may include one outlet, or more than one outlet so that the device may be used by more than one user at a time.

Traditional shisha devices are typically used in combination with a shisha substrate, sometimes referred to in that art as hookah tobacco, tobacco molasses, or simply as molasses. Traditional shisha substrates are relatively high in sugar, in some cases comprising up to about 50 percent sugar, compared to about 20 percent which may be found in conventional combustible cigarettes.

Traditional shisha devices also employ charcoal to heat and sometimes combust the shisha substrate to generate an aerosol for inhalation by a user. Using charcoal to heat the shisha substrate may cause full or partial combustion of the tobacco and other ingredients in the shisha substrate.

Different types of electrically operated shisha systems have been proposed. Electrically operated shisha systems replace the charcoal heat source of a traditional shisha device with an electrically powered heater. Almost all proposed electrically operated shisha systems heat an aerosol-forming substrate by one or more of: conduction of heat from a heating element to an aerosol-forming substrate, radiation of heat from a heating element to an aerosol-forming substrate or drawing heated air through an aerosol-forming substrate. Most commonly, heating is achieved by passing an electrical current through an electrically resistive heating element, giving rise to Joule heating of the heating element. Inductive heating systems have also been proposed, in which Joule heating occurs as a result of eddy currents induced in a susceptor heating element.

One problem with previously proposed electrically operated shisha devices is that they may give rise to non-uniform heating of the aerosol-forming substrate. The portion of the aerosol-forming substrate closest to the heating element is heated more quickly or to a higher temperature than portions of the aerosol-forming substrate more remote from the heating element.

It would be desirable to be able to provide uniform heating of an aerosol-forming substrate in a manner that allows for greater design flexibility and that allows for heating control.

In this disclosure, there is provided a shisha system. The shisha system may comprise an aerosol-generating article comprising an aerosol-forming substrate. The shisha system may comprise a first electrode. The shisha system may comprise a second electrode. The shisha system may comprise a shisha device. The shisha device may comprise a liquid cavity configured to contain a volume of liquid, the liquid cavity having a head space outlet. The shisha device may comprise an article cavity configured to receive the aerosol-forming article, the article cavity being in fluid communication with the liquid cavity. The shisha device may comprise an oscillation circuit configured for connection to the first electrode and the second electrode. The oscillation circuit may be configured to supply a radio frequency (RF) alternating voltage to the first electrode and the second electrode for heating the aerosol-forming substrate when the aerosol-generating article is received in the article cavity. The RF voltage between the first electrode and the second electrode may generate an alternating radio frequency (RF) electromagnetic field between the first electrode and the second electrode As used herein, the term "radio frequency (RF) alternating voltage" refers to an alternating voltage that alternates at a frequency within the radio frequency (RF) range.

In particular, in this disclosure there is provided a shisha system comprising an aerosol-generating article and a shisha device. The aerosol-generating article comprises an aerosol-forming substrate. The shisha system further comprises a first electrode and a second electrode.

The shisha device comprises a liquid cavity configured to contain a volume of liquid, the liquid cavity having a head space outlet. The shisha device further comprise an article cavity configured to receive the aerosol-forming article, the article cavity being in fluid communication with the liquid cavity. The shisha device further comprises an oscillation circuit configured for connection to the first electrode and the second electrode. The oscillation circuit is configured to supply a radio frequency (RF) alternating voltage to the first electrode and the second electrode for heating the aerosol-forming substrate when the aerosol-generating article is received in the article cavity.

Such a shisha device is configured to give rise to dielectric heating of the aerosol-forming substrate in the article cavity, as the RF voltage between the first electrode and the second electrode generates an alternating radio frequency (RF) electromagnetic field between the first electrode and the second electrode. Dielectric heating can be uniform within a volume of aerosol-forming substrate, without the creation of hot spots. In particular, dielectric heating reduces the likelihood of combustion of substrate in contact with the first electrode and the second electrode compared to a conventional heater that transfers heat to the substrate via conduction. The shisha device allows for considerable design flexibility in terms of the shape, volume and composition of the aerosol-forming substrate and correspondingly the shape and volume of the article cavity.

The first electrode and the second electrode may have any suitable size, shape and configuration.

In some embodiments, the first electrode and the second electrode are arranged in or around the article cavity when the aerosol-generating article is received in the article cavity.

In some embodiments, the first electrode and the second electrode are arranged to contact the aerosol-generating article when the aerosol-generating article is received in the article cavity. Contact between the aerosol-generating article and the first and second electrodes may improve the efficiency of the dielectric heating of the aerosol-forming substrate.

In some embodiments, the aerosol-generating article may comprise a wrapper or a housing around the aerosol-forming substrate, and the first and second electrodes may contact the wrapper or housing of the aerosol-generating article when the aerosol-generating article is received in the article cavity. Providing a wrapper or a housing around the aerosol-forming substrate may result in there being no need to clean the first and second electrodes compared to conventional heating element arrangements, in which aerosol-forming substrate residue may build-up on the heating element.

In some embodiments, at least one of the first electrode and the second electrode are arranged to contact the aerosol-forming substrate of the aerosol-generating article when the aerosol-generating article is received in the article cavity. In some preferred embodiments, both the first electrode and the second electrode are configured to contact the aerosol-forming substrate when the aerosol-generating article is received in the article cavity.

In some preferred embodiments, the second electrode is spaced apart from the first electrode to receive at least a portion of the aerosol-forming substrate between the first electrode and the second electrode. In particular, the second electrode may be spaced apart from the first electrode to receive at least a portion of the aerosol-forming substrate between the first electrode and the second electrode when the aerosol-generating article is received in the article cavity. In these embodiments, it may be considered that the first electrode, the second electrode and the aerosol-forming substrate form a capacitor.

In some embodiments, at least one of the first and second electrode may be substantially planar. A substantially planar electrode may have a substantially elliptical, circular, square, rectangular or any other polygonal shape.

In some preferred embodiments, the first electrode is a substantially planar electrode, and the second electrode is a substantially planar electrode. In these embodiments, the second electrode may be arranged substantially parallel to the first electrode. In some particularly preferred embodiments, the second electrode is arranged opposite the first electrode. The first electrode and the second electrode may be arranged at opposite sides of the article cavity. The second electrode may be directly opposite the first electrode. In other words, the second electrode may be arranged facing the first electrode. The second electrode may be arranged opposite and facing the first electrode. In some embodiments, the second electrode is arranged adjacent, or next to, the first electrode. Where the second electrode is arranged adjacent, or next to, the first electrode, the first electrode and the second electrode may be arranged opposite and spaced apart from a third electrode, the third electrode being electrically connected to ground.

In some embodiments, at least one of the first and second electrodes may be substantially tubular. In some embodiments, at least one of the first and second electrodes may be substantially cylindrical. An electrode may be a substantially cylindrical, tubular electrode.

In some embodiments, at least one of the first and second electrodes may be substantially elongate.

In some preferred embodiments, one of the first electrode and the second electrode is a substantially tubular electrode, and the other of the first electrode and the second electrode is arranged within the tubular electrode. In other words, the tubular electrode may substantially circumscribe the other cylindrical electrode. In some embodiments, the first electrode is a tubular electrode, and the second electrode is arranged within the tubular first electrode. In some embodiments, the second electrode is a tubular electrode, and the first electrode is arranged within the tubular second electrode. A tubular electrode comprises an inner passage. An electrode arranged within a tubular electrode may be arranged within the inner passage of the tubular electrode. In these preferred embodiments, the first electrode and the second electrode may be arranged substantially coaxially.

In some embodiments, at least one of the first electrode and the second electrode is gas permeable, to enable air to flow through the electrode. In some embodiments, at least a portion of at least one of the first electrode and the second electrode may be formed from a gas permeable material. In some embodiments, one or more slots are formed in at least one of the first electrode and the second electrode. The one or more slots may have any shape, size, number and arrangement to enable sufficient air to flow through the electrode. In some embodiments, at least one of the first electrode and the second electrode is formed from a metal mesh.

An electrode may have any suitable surface area. A suitable electrode surface area may be between about 0.5 square centimetres ($cm^2$) and about 100 square centimetres ($cm^2$). For example, an electrode surface area may be between about 1 square centimetre and about 80 square centimetres ($cm^2$). In some preferred embodiments, an electrode may have a surface area of about 20 square centimetres ($cm^2$) or about 25 square centimetres ($cm^2$).

The second electrode may be spaced from the first electrode by any suitable distance. For example, the second electrode may be spaced apart from the second electrode by between about 0.1 millimetres and about 20 millimetres, between about 0.1 millimetres and about 10 millimetres, or between about 1 millimetre and about 10 millimetres.

In some embodiments, the shisha device comprises the first electrode and the second electrode. In these embodiments, the first electrode and the second electrode may be arranged in or around the article cavity of the shisha device. The second electrode may be spaced apart from the first electrode to receive at least a portion of the aerosol-forming substrate between the first electrode and the second electrode. The first electrode and the second electrode may be arranged and configured to contact an aerosol-generating article when an aerosol-generating article is received in the article cavity. In some of these embodiments, the first electrode and the second electrode are arranged in substantially fixed positions, such that an aerosol-generating article may be introduced into a predefined space between the first electrode and the second electrode. In some of these embodiments, at least one of the first electrode and the second electrode is movable relative to the other electrode to enable introduction of an aerosol-generating article into the article cavity, and removal of the aerosol-generating article from the article cavity. In some of these embodiments, one of the first electrode and the second electrode may be arranged to penetrate an aerosol-generating article when an aerosol-generating article is received in the article cavity.

In some of these embodiments, an electrode may be configured to penetrate an aerosol-forming substrate. For example, an electrode may be in the form of a pin or a blade. Preferably, an electrode configured to penetrate an aerosol-forming substrate is elongate. In particular, where one of the first electrode and the second electrode is substantially circumscribed by the other of the first electrode and the second electrode, the electrode that is circumscribed by the other electrode may be configured to penetrate an aerosol-generating article when an aerosol-generating article is received in the article cavity. An electrode configured to penetrate an aerosol-generating article may extend into the article cavity. In some of these embodiments where one of the first electrode and the second electrode is a cylindrical, tubular electrode, the cylindrical, tubular electrode may define a surface of the article cavity. In some of these embodiments where the first electrode and the second electrode are planar electrodes, the first electrode and the second electrode may form opposing sides of the article cavity.

In some embodiments, the shisha device comprises one of the first electrode and the second electrode, and the aerosol-generating article comprises the other one of the first electrode and the second electrode. In these embodiments, the shisha device comprises an electrical contact for electrically connecting the electrode of the aerosol-generating article to the oscillation circuit when the aerosol-generating article is received in the article cavity. In these embodiments, the electrode of the shisha device may be arranged in or around the article cavity, and the electrical contact of the shisha device may be arranged in or around the article cavity.

In these embodiments, the electrode of the shisha device may be any suitable type of electrode. For example, the electrode may be a planar electrode or a tubular electrode. In these embodiments, the electrode may be an elongate electrode. The electrode may be arranged to contact an aerosol-generating article when an aerosol-generating article is received in the article cavity. The electrode may be arranged to contact aerosol-forming substrate of an aerosol-generating article when an aerosol-generating article is received in the article cavity. The electrode may be configured to penetrate aerosol-forming substrate of an aerosol-generating article when an aerosol-generating article is received in the article cavity.

In these embodiments, the electrical contact of the shisha device is arranged to contact the electrical contact of the aerosol-generating article when the aerosol-generating article is received in the article cavity. In these embodiments, the electrode of the shisha device is spaced apart from the electrical contact of the shisha device. The electrical contact of the shisha device may be any suitable shape and size, and may be arranged in any suitable position to make an electrical connection with the electrical contact of the aerosol-generating article when the aerosol-generating article is received in the article cavity. For example, the electrical contact may be arranged at a side wall of the article cavity. The electrical contact of the shisha device may form a point contact, a ring contact or a pin contact.

In some embodiments, the aerosol-generating article comprises the first electrode and the second electrode, and the shisha device comprises a first electrical contact for contacting the first electrode and a second electrical contact for contacting the second electrode when the aerosol-generating article is received in the article cavity. The first electrical contact is arranged to make an electrical connection with the first electrode of the aerosol-generating article when the aerosol-generating article is received in the article cavity. The second electrical contact is arranged to make an electrical connection with the second electrode of the aerosol-generating article when the aerosol-generating article is received in the article cavity. The first electrical contact may be arranged in any suitable position to make an electrical connection with the first electrical contact of the aerosol-generating article when the aerosol-generating article is received in the article cavity. The second electrical contact may be arranged in any suitable position to make an electrical connection with the second electrical contact of the aerosol-generating article when the aerosol-generating article is received in the article cavity. For example, either or both of the first and second electrical contacts may be arranged at a side wall of the article cavity. The first and second electrical contacts of the shisha device may form a point contact, a ring contact or a pin contact. In some embodiments, the second electrical contact is substantially identical to the first electrical contact. In some embodiments, the second electrical contact is different to the first electrical contact.

The shisha device comprises an oscillation circuit that is configured to supply a radio frequency (RF) alternating voltage to the first electrode and the second electrode for heating the aerosol-forming substrate when the aerosol-generating article is received in the article cavity.

The oscillation circuit may comprise a radio frequency (RF) signal generator. The RF signal generator may be any suitable type of RF signal generator. In some embodiments, the RF signal generator is a solid state RF transistor. Advantageously, a solid state RF transistor may be configured to generate and amplify the RF electromagnetic field. Using a single transistor to provide both the generating and amplification of the RF electromagnetic field allows for a shish device to be compact. The solid state RF transistor may be, for example, a LDMOS transistor, a GaAs FET, a SiC MESFET or a GaN HFET.

In some embodiments, the oscillation circuit may further comprise a frequency synthesizer disposed between the RF signal generator and the first electrode and the second electrode.

In some embodiments, the oscillation circuit may further comprise a phase shift network disposed between the RF signal generator and the first electrode and the second electrode. Where the oscillation circuit comprises a phase shift network, the phase shift network divides the RF energy received from the RF signal generator into two separate, equal components that are out of phase with each other. Typically, the phase shift network supplies one of the components to the first electrode, and supplies the other component to the second electrode. The two substantially equal components of the RF energy received from the RF signal generator are preferably substantially 90 degrees or 180 degrees out of phase with each other. The two substantially equal components may be any multiple of 90 degrees or 180 degrees out of phase with each other. It will be appreciated that the precise phase relationship between the two components is not essential, but rather that the two components are not in phase.

In some embodiments, the phase network is configured to divide the RF energy from the RF signal generator into two substantially equal components, one out of phase with the other, and each component is applied to a different one of the first electrode and the second electrode. In some of these embodiments, the first electrode and the second electrode may be arranged opposite and facing each other. In some of these embodiments, the first electrode and the second electrode are arranged side by side, spaced apart from and facing an opposing third electrode, that is connected to ground. The space between the first and second electrodes and the third electrode may form the article cavity.

As used herein, radio frequency (RF) means a frequency between about 1 hertz (Hz) and about 300 megahertz (MHz). Accordingly, as used herein, RF frequencies include microwave frequencies. Preferably, the RF electromagnetic field has a frequency of between about 1 hertz (Hz) and about 300 megahertz (MHz). More preferably, the RF electromagnetic field has a frequency between about 1 megahertz (MHz) and about 300 megahertz (MHz). In one embodiment the RF electromagnetic field has a frequency of about 4 megahertz (MHz).

As used herein, the term "aerosol-forming substrate" relates to a substrate capable of releasing volatile compounds that can form an aerosol. Such volatile compounds may be released by heating the aerosol-forming substrate. An aerosol-forming substrate is typically part of an aerosol-generating article. For example, an aerosol-forming substrate may be a shisha aerosol-forming substrate.

A shisha aerosol-forming substrate may also be referred to in the art as hookah tobacco, tobacco molasses, or simply as molasses. A shisha aerosol-forming substrate may be relatively high in sugar, compared to conventional combustible cigarettes or tobacco based consumable items intended to be heated without burning to simulate a smoking experience. The aerosol-forming substrate will later be described in more detail As used herein, the term "aerosol-generating article" refers to an article comprising an aerosol-forming substrate that is capable of releasing volatile compounds that can form an aerosol. For example, an aerosol-generating article may be a cartridge for a shisha device. A cartridge for a shisha device comprises an aerosol-forming substrate. Preferably, a cartridge for a shisha device comprises a shisha aerosol-forming substrate. A cartridge for a shisha device is receivable by a shisha device and operable with the shisha device to generate an aerosol that is inhalable by a user drawing or puffing on a mouthpiece of the shisha device. An aerosol-generating article may be disposable.

As used herein, the term "shisha device" refers to a device that interacts with an aerosol-forming substrate to generate an aerosol. A shisha device is separate from an aerosol-forming substrate. A shisha device is configured for combination with an aerosol-forming substrate for heating the aerosol-forming substrate. The aerosol-forming substrate may be provided as part of an aerosol-generating article. A shisha device is separate from an aerosol-generating article. The shisha device is configured for combination with an aerosol-generating article for heating the aerosol-forming substrate of the aerosol-generating article. Shisha devices are different to other aerosol-generating devices, at least in that volatile compounds released from a heated substrate are drawn through a liquid basin of the shisha device before inhalation by a user. A shisha device may include more than one outlet so that the device may be used by more than one user at a time. A shisha device may comprise an airflow conduit, such as a stem pipe, for directing volatile compounds released from the aerosol-forming substrate to the liquid basin.

As used herein, the term "shisha system" refers to the combination of a shisha device with an aerosol-forming substrate or with an aerosol-generating article comprising an aerosol-forming substrate. In the shisha system, the aerosol-forming substrate or an aerosol-generating article comprising the aerosol-forming substrate and the shisha device cooperate to generate an aerosol.

A shisha device differs from other aerosol-generating devices in that the aerosol generated by a shisha device is drawn through a volume of liquid, typically water, before inhalation of the aerosol by a user. In more detail, when a user draws on a shisha device, volatile compounds released from a heated aerosol-forming substrate are drawn through an airflow conduit of the shisha device into a volume of liquid. The volatile compounds are drawn out of the volume of liquid into a headspace of the shisha device, in which the volatile compounds form an aerosol. The aerosol in the headspace is then drawn out of the headspace at a headspace outlet for inhalation by a user. The volume of liquid, typically water, acts to reduce the temperature of the volatile compounds, and may impart additional water content to the aerosol formed in the headspace of the shisha device. This process adds distinctive characteristics to the process of using a shisha device for a user, and imparts distinctive characteristics to the aerosol generated by the shisha device and inhaled by a user.

In some preferred embodiments, the shisha device comprises an airflow conduit for conveying volatilised compounds, released from a heated aerosol-forming substrate, from the article cavity to the liquid cavity. More specifically, the shisha device may comprise an airflow conduit configured to convey volatilised compounds, released from a heated aerosol-forming substrate, from the article cavity to a volume of liquid in the liquid cavity. Typically, the airflow conduit is configured to convey aerosol from the article cavity to below a liquid fill level in the liquid cavity. The liquid fill level in the liquid cavity is the level to which the liquid cavity is intended to be filled with liquid, such that the shisha device may be operated optimally. The airflow conduit may have an opening in the liquid cavity, below the liquid fill level of the liquid cavity.

The shisha device comprises a headspace outlet. The headspace outlet is an outlet through which aerosol may be drawn out of the liquid cavity. The headspace outlet may be arranged above the liquid fill level of the liquid cavity. The space above the liquid fill level of the liquid cavity is referred to as the headspace. The headspace in the liquid cavity is the space in which volatile compounds drawn from the article cavity and through the volume of liquid in the liquid cavity may condense to form an aerosol that is suitable for inhalation by a user. The headspace in the liquid cavity is not intended to comprise any of the volume of liquid in the liquid cavity. Accordingly, the headspace may be arranged above the liquid fill level of the liquid cavity, which is the level to which the liquid cavity is intended to be filled with liquid. The headspace outlet may be arranged to enable aerosol to be drawn from the liquid cavity. The headspace outlet may be in fluid communication with the headspace.

A mouthpiece may be fluidly connected to the headspace outlet. The mouthpiece may be configured for a user to draw on and receive aerosol generated by the shisha device. In some embodiments, the mouthpiece may be fixed to the headspace outlet. In other words, the mouthpiece may be attached to the headspace outlet such that the mouthpiece may not be removed from the headspace outlet without damaging one or both of the mouthpiece and the headspace outlet. The mouthpiece may be removably couplable to the headspace outlet. In other words, the mouthpiece may be configured to be attached to the headspace outlet and removed from the headspace outlet. In some embodiments, the mouthpiece may be interchangeable with a removable one wait air valve. In this way, where more than one headspace outlets are provided, the number of mouthpieces can be adjusted according to a number of users in any given usage session without adversely affecting the resistance to draw (RTD) of the device. The mouthpiece may comprise a hose connected to the headspace outlet. The hose may be a flexible hose.

The mouthpiece may include an activation element. The activation element may comprise a switch that is activatable by a user. The mouthpiece may comprise a puff sensor arranged to detect a user puffing on the mouthpiece. The activation element may comprise both a switch activatable by the user and a puff sensor. The activation element may be operably coupled to control circuitry of the shisha device. The activation element may be wirelessly coupled to control circuitry of the shisha device. Activation of the activation element may cause the control circuitry of the shisha device to activate the heating element, rather than constantly supplying power to the heating element. Accordingly, the use of an activation element may serve to save energy relative to devices not employing such elements to provide on-demand heating rather than constant heating.

The shisha device may comprise a plurality of headspace outlets. For example, the shisha device may comprise two, three, four, five or six headspace outlets. Providing more than one headspace outlet may enable more than one user to draw aerosol from the liquid cavity at a time. In other words, providing a plurality of headspace outlets may enable a plurality of users to use the shisha device simultaneously.

The shisha device comprises an article cavity configured to receive an aerosol-generating article comprising an aerosol-forming substrate.

The article cavity may comprise one or more walls defining the article cavity.

One of the one or more walls of the article cavity may comprise the first electrode. One of the one or more walls of the article cavity may comprise the second electrode. In some embodiments, at least a portion of one of the one or more walls may form the first electrode. In some embodiments, at least a portion of one of the one or more walls may form the second electrode. A wall of the article cavity may form the first electrode. A wall of the article cavity may form the second electrode. In some embodiments, the article cavity comprises a first wall forming the first electrode, and a second wall forming the second electrode. Opposing walls of the article cavity may form the first electrode and the second electrode.

At least a portion of one of the one of or more walls may form an electrical contact for contacting an electrode of an aerosol-generating article. In some embodiments, the article cavity comprises a first wall comprising a first electrical contact for contacting a first electrode of an aerosol-generating article received in the article cavity, and the article cavity comprises a second wall comprising a second electrical contact for contacting a second electrode of an aerosol-generating article received in the article cavity. Opposing walls of the article cavity may comprise a first electrical contact and a second electrical contact.

Air must also be allowed to enter the article cavity. Accordingly, in some embodiments, at least a portion of the one or more walls may be formed from a gas permeable material. In some of these embodiments, one or more walls of the article cavity may be formed from a gas permeable material. In some embodiments, one or more slots may be formed in the one or more walls to allow for ingress of air into the article cavity. The one or more slots may have any suitable shape and size to allow air to enter the article cavity. For example, at least one of the one or more slots may have an L-shape, an S-shape, a T-shape or an I-shape.

In some embodiments, a portion of one or more of the walls of the article cavity is formed from a gas permeable material or comprises one or more slots, and a different portion of one or more of the walls comprises or forms one of the first or second electrodes.

The article cavity may have any suitable shape and size. In particular, the article cavity may have a shape and a size that is complementary to an aerosol-generating article. In other words, the article cavity may have the same or a similar shape and dimensions to at least a portion of an aerosol-generating article. The article cavity may be configured to receive the aerosol-generating article with a close fit. In other words, the walls of the article cavity may contact the aerosol-generating article when the aerosol-generating article is received in the article cavity.

The article cavity may have any suitable transverse cross-section. For example, the article cavity may have a circular, oval, rectangular, square, triangular or any other polygonal transverse cross-sectional shape.

In some embodiments, the article cavity is substantially cuboidal.

In some embodiments, the article cavity is substantially cylindrical.

In some embodiments, the article cavity is substantially frustoconical. In some embodiments, the width or diameter of one end of the article cavity is greater than the width or diameter of the other end of the article cavity. In other words, the article cavity may be tapered from one end to the other end. Providing the article cavity with one end that is narrower than the other end may enable the article cavity to retain an aerosol-generating article in the article cavity under the influence of gravity alone.

The article cavity may comprise an opening. The article cavity may be configured to receive an aerosol-generating article containing the aerosol-forming substrate through the opening. The article cavity may comprise an open end. The article cavity may be configured to receive an aerosol-forming article containing the aerosol-forming substrate through the open end.

In some embodiments, the article cavity may comprise a moveable closure. The moveable closure may be configured to substantially close the open end of the article cavity. When the moveable closure is arranged to substantially close the open end of the article cavity, the moveable closure may substantially prevent an aerosol-forming article from being removable from the article cavity. The moveable closure may be rotatably moveable to close the open end of the article cavity. The moveable closure may be slidably moveable to close the open end of the article cavity. The moveable closure may be removably couplable to the open end of the article cavity to substantially close the open end of the article cavity.

In embodiments comprising a movable closure, the movable closure may comprise one of the first electrode and the second electrode. The movable closure may comprise the first electrode.

The movable closure may comprise the second electrode.

In embodiments comprising a movable closure, the movable closure may comprise an electrical contact for electrical connection to an electrode of an aerosol-generating article when an aerosol-generating article is received in the article cavity. The movable closure may comprise an electrical contact electrically connected to the oscillation circuit. The movable closure may comprise an electrical contact electrically connected to the oscillation circuit by a flexible circuit.

In some embodiments, the article cavity may comprise two open ends. For example, the article cavity may comprise an open first end, and an open second end, opposite the first end. Advantageously, providing the article cavity with two open ends may enable air to be drawn through the article cavity, between the open ends.

In some embodiments, the article cavity may comprise an open end and a closed end. The closed end may enable the article cavity to retain an aerosol-generating article in the article cavity.

In some embodiments, the article cavity is substantially frustoconical, having a first end that is narrower than a second end. In these embodiments, the first end of the article cavity may be open and the second end of the article cavity may be open. This may enable air to be drawn through the article cavity, from the first end to the second end. In these embodiments, an aerosol-generating article configured to be received in the article cavity may comprise a fluid permeable first end external surface and a fluid permeable second end external surface. The fluid permeable first end and second end external surfaces of the aerosol-generating article may enable air to flow though the article cavity, between the first end and the second end, when the aerosol-generating article is received in the article cavity.

The article cavity may have any suitable shape and dimensions. The article cavity may have a length of between about 10 millimetres and about 100 millimetres, between about 20 millimetres and about 90 millimetres or between about 25 millimetres and about 80 millimetres. In some preferred embodiments, the article cavity may have a length of about 33 millimetres, about 34 millimetres, about 35 millimetres, about 36 millimetres, about 37 millimetres, about 38 millimetres, 39 millimetres, about 40 millimetres, about 41 millimetres or about 42 millimetres. The article cavity may have a width or diameter of between about 5 millimetres and about 70 millimetres, or between about 10 millimetres and about 60 millimetres or between about 10 millimetres and about 50 millimetres. In some preferred embodiments, the article cavity may have a width or diameter of about 35 millimetres, about 36 millimetres, about 37 millimetres, about 38 millimetres, 39 millimetres, about 40 millimetres, about 41 millimetres, about 42 millimetres, about 43 millimetres, about 44 millimetres or about 45 millimetres.

As used herein, the term 'length' refers to the maximum longitudinal dimension between a base or bottom end and a top end of a shisha device, a component of the shisha device, an aerosol-generating article or a component of an aerosol-generating article. As used herein, the term 'width' or 'diameter' refers to the maximum transverse dimension of a shisha device, a component of the shisha device, an aerosol-generating article or a component of an aerosol-generating article. For example, where an aerosol-generating article has a frustoconical shape, the width or diameter of the aerosol-generating article is the width or diameter of the base of the frustoconical shape, which is the widest part of the aerosol-generating article at any point along the length of the aerosol-generating article. A transverse dimension is a dimension measured in a direction transverse to a longitudinal direction, the longitudinal direction being the direction in which longitudinal dimensions are measured. As used herein, the term 'transverse cross-section' refers to a cross-section taken along a transverse plane.

As used herein, the terms 'top' and 'bottom' refer to relative positions of elements, or portions of elements, of a shisha device, a component of the shisha device, an aerosol-generating article or a component of an aerosol-generating article.

The article cavity may be located in a heating unit. The heating unit may comprise the article cavity. The heating unit may comprise one or more of: the first electrode, the second electrode and one or more electrical contacts for electrical connection to an electrode of an aerosol-generating article received in the article cavity. The heating unit may further comprise one or more of control circuitry, including the oscillation circuit, and a power supply. The heating unit may further comprise one or more electrical connectors for electrically connecting one or more electrical components to the heating unit, such as control circuitry and a power supply.

The heating unit may comprise a housing having one or more external walls formed from a material opaque to the RF electromagnetic field. Preferably, all of the external walls of the heating unit are formed from material opaque to the RF electromagnetic field. However, it will be appreciated that the heating unit may comprise a housing having one or more external walls formed from a material transparent to the RF electromagnetic field. In some embodiments, all of the external walls of the heating unit are formed from material transparent to the RF electromagnetic field. The heating unit may comprise an opening to enable insertion of an aerosol-generating article into the article cavity. The heating unit may comprise a movable closure, such as a lid or door, that is movable between an open position and a closed position. The open position may enable insertion of an aerosol-generating article into the article cavity, and the closed position may substantially prevent or inhibit removal of an aerosol-generating article from the article cavity. The movable closure may be movably coupled, such as rotatably coupled or slidably coupled, to an external wall of the heating unit housing. The movable closure may be removably couplable to an external wall of the heating unit housing.

The shisha device may comprise an air inlet. The air inlet may enable ambient air to be drawn into the shisha device. A device housing of the shisha device may comprise the air inlet. The air inlet may enable ambient air to be drawn into the article cavity. In embodiments in which one or more ends of the article cavity are at an external surface of the shisha device, the article cavity may comprise the air inlet. In embodiments in which the article cavity comprises an open end for receiving an aerosol-generating article, the open end may form the air inlet.

An airflow path may be defined between the air inlet and the headspace outlet. The airflow path may extend through the article cavity. The airflow path may extend from the article cavity into the liquid cavity. The airflow path may extend from the article cavity, via an airflow conduit, and into the liquid cavity, below a liquid fill level of the liquid cavity. The airflow path may extend from below the liquid fill level of the liquid cavity to the headspace of the liquid cavity, and out of the headspace outlet.

The airflow path may comprise one or more labyrinthine portions. The one or more labyrinthine portions may extend past one or more radiation shielding elements. In embodiments in which the airflow path passes through the article cavity or through the generated RF electromagnetic field, the airflow path may comprise a labyrinthine portion past one or more radiation shielding elements to prevent the escape of RF radiation through the air inlet or the air outlet. One of more fluid permeable radiation shielding elements may be provided in the airflow path. For example, a metal mesh may be provided in the airflow path.

In some embodiments, the article cavity is configured such that an airflow path through the article cavity is aligned with the airflow conduit. In some embodiments, the article cavity is configured such that an airflow path through the article cavity is aligned substantially perpendicular to one or both of the first electrode and the second electrode. In some embodiments, the article cavity is configured such that an airflow path through the article cavity is substantially parallel to one or both of the first electrode and the second electrode.

It is possible to use a closed loop control scheme. The shisha device may comprise a sensor in or adjacent to the article cavity, the sensor providing a signal indicative of a temperature in the article cavity, and a controller connected to receive the signal from the sensor and connected to control the oscillation circuit in dependence on the signal from the sensor.

The sensor may comprise a temperature sensor that directly measures temperature. The sensor may comprise a sampling antenna or a plurality of sampling antennas configured to detect perturbation of the electromagnetic field in the article cavity, which is indicative of the temperature in the article cavity. The dielectric properties of the aerosol-forming substrate change in dependence on temperature. The frequency or amplitude, or both frequency and amplitude, of the electromagnetic field may be adjusted by the controller based on the signal from the sensor to control the heating provided by the device.

Overheating may be detected by the sensor, and underheating may be detected by the sensor. The frequency and amplitude of the electromagnetic field may be adjusted accordingly depending on whether overheating or underheating are detected. Control circuitry of the shisha device may be configured to adjust at least one of the frequency and amplitude of the electromagnetic field based on whether overheating is detected by the sensor or overheating is detected by the sensor.

Malfunctions may be detected by the sensor. If a malfunction is detected, the shisha device may automatically switch off. It may also be possible to detect the presence of inappropriate materials in the article cavity. If an inappropriate material is detected in the article cavity, the shisha device may automatically switch off. Similarly, if the signal for the sensor suggests that no aerosol-forming substrate is present in the article cavity, the device may automatically switch off. To automatically switch off the shisha device, control circuitry of the shisha device may be configured to prevent power from being supplied to the oscillation circuit.

It may be desirable to maintain the temperature within the article cavity within a predetermined temperature range. It may be desirable to maintain the temperature of the aerosol-forming substrate below a temperature at which the aerosol-forming substrate combusts.

The ability to control the amount of heating provided by the shisha device based on a feedback signal also allows different aerosol-forming substrates to be used. Different aerosol-forming substrates may desirably be heated to different temperatures. Accordingly, providing a mechanism for temperature control allows optimal conditions to be achieved for different aerosol-forming substrates or different designs of aerosol-forming article.

The shisha device may comprise a puff detector configured to detect when a user takes a puff on the shisha device. As used herein, the term “puff” is used to refer to a user drawing on the shisha device to receive aerosol. The puff detector may comprise a temperature sensor. The puff detector may comprise a pressure sensor. The puff detector may comprise both a temperature sensor and a pressure sensor.

The shisha device may comprise control circuitry. The control circuitry may be configured to control the supply of power to the oscillation circuit. The control circuitry may comprise one or more of: a microprocessor, a programmable microprocessor, a microcontroller, and an application specific integrated chip (ASIC) or other electronic circuitry capable of providing control. The control circuitry may comprise further electronic components. For example, in some embodiments, the control circuitry may comprise one or more of: sensors, switches and display elements. The control circuitry may comprise a RF power sensor. The control circuitry may comprise a power amplifier.

In some embodiments, the shisha device is configured to be connected to an external power source. For example, the shisha device may be configured to be connected to a mains power source.

In some embodiments, the shisha device comprises a power source. The power source may be a DC power source. The power source may comprise a battery or another form of charge storage device, such as a capacitor. The power source may comprise a rechargeable lithium ion battery. In some embodiments, the power source is a rechargeable power source. The shisha device may be configured to be connected to an external power source for recharging the rechargeable power source.

The control circuitry may be configured to control the power supplied to the oscillation circuit from the power source.

The power source may provide a power of between about 0.5 Watts and about 50 Watts. In some embodiments, the power source may provide a power of between about 1 Watt and about 40 Watts, or between about 2 Watts and about 30 Watts.

The shisha device may include a vessel. The liquid cavity may be an interior volume of a vessel. The vessel may be configured to contain a liquid. The vessel may define the liquid cavity.

The vessel may comprise the headspace outlet. The vessel may define a liquid fill level. For example, the vessel may comprise a liquid fill level demarcation. A liquid fill level demarcation is an indicator provided on the vessel to indicate the desired level to which the liquid cavity is intended to be filled with liquid. The headspace outlet may be arranged above the liquid fill level. The headspace outlet may be arranged above the liquid fill level demarcation. The vessel may comprise an optically transparent portion. The optically transparent portion may enable a user to observe the contents contained in the vessel. The vessel may be formed from any suitable material. For example, the vessel may be formed from glass or a rigid plastic material. In some embodiments, the vessel is removable from the rest of the shisha assembly. In some embodiments, the vessel is removable from an aerosol-generating portion of the shisha assembly. Advantageously, a removable vessel enables a user to fill the liquid cavity with liquid, empty the liquid cavity of liquid, and clean the vessel.

The vessel may be filled to a liquid fill level by a user. The liquid preferably comprises water. The liquid may comprise water infused with one or more of colorants and flavourants. For example, the water may be infused with one or both of botanical and herbal infusions.

The vessel may have any suitable shape and size. The liquid cavity may have any suitable shape and size. The headspace may have any suitable shape and size.

Typically, a shisha device according to this disclosure is intended to be placed on a surface in use, rather than being carried by a user. As such, a shisha device according to this disclosure may have a particular use orientation, or range of orientations, at which the device is intended to be oriented during use. Accordingly, as used herein, the terms ‘above’ and ‘below’ refer to relative positions of features of a shisha device or a shisha system when the shisha device or shisha system is held in a use orientation.

In some embodiments, the article cavity is arranged above the liquid cavity. In these embodiments, an airflow conduit may extend from the article cavity to below a liquid fill level of the liquid cavity. Advantageously, this may ensure that volatile compounds released from aerosol-forming substrate in the article cavity are delivered from the article cavity to the volume of liquid in the liquid cavity, rather than to the headspace above the liquid cavity. In these embodiments, the airflow conduit may extend from the aerosol cavity into the liquid cavity through the headspace in the liquid cavity above the liquid fill level, and into the volume of liquid below the liquid fill level. The airflow conduit may extend into the liquid cavity through a top or upper end of the liquid cavity.

In some embodiments, the article cavity is arranged below the liquid cavity. In these embodiments, a one-way valve may be arranged between the article cavity and the liquid cavity. The one-way valve may prevent liquid from the liquid cavity from entering the article cavity under the influence of gravity. In these embodiments, the one-way valve may be provided in an airflow conduit extending from the article cavity into the liquid cavity. In these embodiments, the airflow conduit may extend into the liquid cavity to below the liquid fill level. The airflow conduit may extend into the liquid cavity through a bottom end of the liquid cavity.

In this disclosure there is also provided a shisha device.

In some embodiments, the shisha device comprises a liquid cavity, an article cavity, a first electrode and a second electrode, and an oscillation circuit. The liquid cavity is configured to contain a volume of liquid, and the liquid cavity comprises a head space outlet. The article cavity is configured to receive an aerosol-generating article, and the article cavity is in fluid communication with the liquid cavity. The first electrode and the second electrode are arranged in or around the article cavity, and the second electrode is spaced apart from the first electrode to receive at least a portion of an aerosol-generating article between the first electrode and the second electrode when an aerosol-generating article is received in the article cavity. The oscillation circuit is connected to the first electrode and the second electrode, and is configured to supply a radio frequency (RF) alternating voltage to the first electrode and the second electrode for heating the aerosol-forming substrate when the aerosol-generating article is received in the cavity between the first electrode and the second electrode.

In some embodiments, the shisha device comprises a liquid cavity, an article cavity, a first electrode, an electrical contact, and an oscillation circuit. The liquid cavity is configured to contain a volume of liquid, and the liquid cavity comprises a head space outlet. The article cavity is configured to receive an aerosol-generating article, and the article cavity is in fluid communication with the liquid cavity. The first electrode may be arranged in or around the article cavity. The electrical contact may be arranged in the article cavity for electrical connection to a second electrode, when an aerosol-generating article comprising a second electrode is received in the article cavity. The oscillation circuit is connected to the first electrode and the second electrode, and is configured to supply a radio frequency (RF) alternating voltage to the first electrode and the electrical contact. When an aerosol-generating article comprising an aerosol-forming substrate and a second electrode is received in the article cavity, the RF alternating voltage supplied to the electrical contact is supplied to the second electrode, and the aerosol-forming substrate between the first electrode and the second electrode is heated.

In some embodiments, the shisha device comprises a liquid cavity, an article cavity, a first electrical contact, a second electrical contact, and an oscillation circuit. The liquid cavity is configured to contain a volume of liquid, and the liquid cavity comprises a head space outlet. The article cavity is configured to receive an aerosol-generating article, and the article cavity is in fluid communication with the liquid cavity. The first electrical contact may be arranged in or around the article cavity, and is arranged for electrical connection to a first electrode of an aerosol-generating article received in the article cavity. The second electrical contact may be arranged in or around the article cavity for electrical connection to a second electrode of an aerosol-generating article received in the article cavity. The oscillation circuit is connected to the first electrical contact and the second electrical contact, and is configured to supply a radio frequency (RF) alternating voltage to the first electrode and the electrical contact. When an aerosol-generating article comprising an aerosol-forming substrate and a first electrode and a second electrode is received in the article cavity, the RF alternating voltage supplied to the first electrical contact is supplied to the first electrode, the RF alternating voltage supplied to the second electrical contact is supplied to the second electrode, and the aerosol-forming substrate between the first electrode and the second electrode is heated.

In this disclosure there is also provided an aerosol-generating article for use with a shisha device as previously described.

The aerosol-generating article may be any suitable type of aerosol-generating article for use with a shisha device. An aerosol-generating article specifically designed for use with a shisha device may be referred to as a cartridge for a shisha device.

The aerosol-generating article may have any suitable shape and size. In particular, the aerosol-generating article may have a shape and a size that is complementary to an article cavity of a shisha device.

The aerosol-generating article may have any suitable transverse cross-section. For example, the aerosol-generating article may have a circular, oval, rectangular, square, triangular or any other polygonal transverse cross-sectional shape.

In some embodiments, the aerosol-generating article is substantially cylindrical.

In some embodiments, the aerosol-generating article is substantially cuboidal.

In some embodiments, the aerosol-generating article is substantially frustoconical. In some embodiments, the width or diameter of a first end of the aerosol-generating article is greater than the width or diameter of a second end of the aerosol-generating article, opposite the first end. In other words, the aerosol-generating article may be tapered from a first end to a second end. Providing the aerosol-generating article with a second end that is narrower than a first end may enable the aerosol-generating article to be retained in a complementary article cavity under the influence of gravity.

The aerosol-generating article may have a length of between about 10 millimetres and about 100 millimetres, between about 20 millimetres and about 90 millimetres or between about 25 millimetres and about 80 millimetres. In some preferred embodiments, the aerosol-generating article may have a length of about 33 millimetres, about 34 millimetres, about 35 millimetres, about 36 millimetres, about 37 millimetres, about 38 millimetres, 39 millimetres, about 40 millimetres, about 41 millimetres or about 42 millimetres. The aerosol-generating article may have a width or diameter of between about 5 millimetres and about 70 millimetres, or between about 10 millimetres and about 60 millimetres or between about 10 millimetres and about 50 millimetres. In some preferred embodiments, the aerosol-generating article may have a width or diameter of about 35 millimetres, about 36 millimetres, about 37 millimetres, about 38 millimetres, 39 millimetres, about 40 millimetres, about 41 millimetres, about 42 millimetres, about 43 millimetres, about 44 millimetres or about 45 millimetres.

The aerosol-generating article may comprise one or both of the first electrode and the second electrode. In some embodiments, the aerosol-generating article comprises one of the first electrode and the second electrode. In some embodiments, the aerosol-generating article comprises the first electrode and the second electrode.

An electrode may form at least a portion of an outer surface of the aerosol-generating article. An electrode may form an outer surface of the aerosol-generating article. In some embodiments, at least a portion of an electrode may contact the aerosol-forming substrate. In some embodiments, at least a portion of an electrode may be embedded in the aerosol-forming substrate. In other words, at least a portion of an electrode may be substantially surrounded by aerosol-forming substrate. Where at least a portion of an electrode is embedded in the aerosol-forming substrate, a portion of the electrode is not surrounded by the aerosol-forming substrate, such that the electrode may make contact with an electrical contact of the shisha device when the aerosol-generating article is received in the article cavity.

Where the aerosol-generating article comprises both the first electrode and the second electrode at an outer surface of the aerosol-generating article, an electrically insulating element may be disposed on the outer surface of the aerosol-generating article, between the first electrode and the second electrode. The electrically insulating element may ensure that the first electrode and the second electrode do not come into electrical contact. In some of these embodiments, at least a portion of the first electrode may contact the aerosol-forming substrate. In some of these embodiments, at least a portion of the second electrode may contact the aerosol-forming substrate.

As used herein, "electrically conductive" means formed from a material having a resistivity of $1\times10^{-4}$ Ohm meter, or less. As used herein, "electrically insulating" means formed from a material having a resistivity of $1\times10^{4}$ Ohm meter or more.

The aerosol-generating article comprises aerosol-forming substrate. The aerosol-forming substrate may be encased in a wrapper or container. In some embodiments, the aerosol-forming substrate may be coated in a coating.

A wrapper may define a substrate cavity. The aerosol-forming substrate may be positioned in a substrate cavity within a wrapper.

In some embodiments, at least a portion of the wrapper may comprise an electrically conductive material. In some embodiments, the entire wrapper may comprise an electrically conductive material. The electrically conductive material may form one of the first electrode and the second electrode. The electrically conductive material may form both the first electrode and the second electrode. Where the wrapper comprises a first portion formed from an electrically conductive material forming the first electrode, and a second portion formed from an electrically conductive material forming the second electrode, the wrapper may also comprise a portion formed from an electrically insulative material, arranged between the first portion and the second portion.

At least a portion of the wrapper may be formed from a gas permeable material to enable the ingress of air to the aerosol-forming substrate and the egress of volatile compounds from the aerosol-generating article. One or more slots may be formed in the wrapper to allow for ingress of air to the aerosol-forming substrate and the egress of volatile compounds from the aerosol-generating article.

In some embodiments, a portion of the wrapper formed from an electrically conductive material is gas permeable. In these embodiments, the electrically conductive portion of the wrapper may be formed from a metal mesh. In some embodiments, a portion of the wrapper formed from an electrically insulative material may be gas permeable.

The aerosol-forming substrate may be encased in a container. A container may define a substrate cavity. The aerosol-forming substrate may be positioned in a substrate cavity within a container.

In some embodiments, the container may comprise an electrically conductive material. In some embodiments, the container may comprise an electrically insulative material.

In some embodiments, the container may comprise one or more walls. At least one wall of the container may comprise an electrically conductive material. At least one wall of the container may comprise an electrically insulative material. Two opposing walls of the container may comprise an electrically conductive material. All of the walls of the container may comprise an electrically conductive material. Where two opposing walls of the container comprise an electrically conductive material, one or more walls of the container extending between the two opposing walls may comprise an electrically insulative material.

At least a portion of the container maybe fluid permeable. A fluid permeable portion of the container may enable volatile compounds released from the aerosol-forming substrate to be released from the aerosol-generating article.

A wall of the container comprising electrically insulative material may be fluid permeable. A wall of the container comprising electrically conductive material may be fluid permeable. For example, a fluid permeable, electrically conductive material may be a metal mesh. Accordingly, at least a portion of the container may be formed from a metal mesh. In some embodiments, the container may be formed from a metal mesh. In some embodiments, one or more slots are formed in the container to enable ingress of air to the aerosol-forming substrate and egress of volatile compounds from the aerosol-generating article.

In some embodiments, at least a portion of the aerosol-forming substrate is coated with a coating. As used herein, the term 'coating' refers to a layer of material that covers and is adhered to the aerosol-forming substrate. The coating may be applied to cover and adhere to at least a portion of the aerosol-forming substrate by any suitable methods known in the art, including, but not limited to, spray-coating, vapour deposition, dipping, material transfer (for example, brushing or gluing), electrostatic deposition or any combination thereof.

In some embodiments, the coating may comprise an electrically conductive material. In some embodiments, the coating may comprise an electrically insulative material.

One or more regions of the external surface of the aerosol-forming substrate may be exposed. In other words, one or more regions of the external surface of the aerosol-forming substrate may be free from any coating. This may ensure that volatile compounds released from the aerosol-forming substrate are able to escape from the aerosol-generating article.

In some embodiments, the coating may comprise a fluid permeable material.

In some embodiments, one or more regions of the external surface of the aerosol-forming substrate may be coated with a first coating, and one or more regions of the external surface of the aerosol-forming substrate may be coated with a second coating.

One of the first coating and the second coating may comprise an electrically conductive material. One of the first coating and the second coating may comprise an electrically insulative material. One of the first coating and the second coating may comprise an electrically conductive material, and the other of the first electrode and the second electrode may comprise an electrically insulative material. Both the first coating and the second coating may comprise an electrically conductive material, such that the first coating forms the first electrode and the second coating forms the second electrode.

One of the first coating and the second coating may comprise a fluid permeable material. Both the first coating and the second coating may comprise a fluid permeable material. In some preferred embodiments, one of the first coating and the second coating comprises an electrically conductive material, and the other of the first coating and the second coating comprises a fluid permeable, electrically insulative material.

In some embodiments, at least a portion of a wrapper or container encasing the aerosol-forming substrate is coated with a coating. The coating may comprise an electrically conductive material.

The aerosol-forming substrate may be any suitable substrate capable of releasing volatile compounds on heating.

In some preferred embodiments, the aerosol-forming substrate is in the form of a suspension. For example, the aerosol-forming substrate may include molasses. As used herein, "molasses" means an aerosol-forming substrate composition comprising a suspension having at least about 20 percent by weight of sugar. For example, the molasses may include at least about 25 percent by weight of sugar, such as at least about 35 percent by weight of sugar. Typically, the molasses will contain less than about 60 percent by weight of sugar, such as less than about 50 percent by weight of sugar.

Preferably, the aerosol-forming substrate is a shisha substrate. As used herein, a "shisha substrate" refers to an aerosol-forming substrate composition comprising at least about 20 percent by weight of sugar. A shisha substrate may comprise molasses. A shisha substrate may comprise a suspension having at least about 20 percent by weight of sugar.

The aerosol-forming substrate may be solid or liquid or comprise both solid and liquid components.

The aerosol-forming substrate may include nicotine. The nicotine containing aerosol-forming substrate may include a nicotine salt matrix. The aerosol-forming substrate may include plant-based material. The aerosol-forming substrate preferably includes tobacco. The tobacco containing material preferably contains volatile tobacco flavour compounds, which are released from the aerosol-forming substrate upon heating. The aerosol-forming substrate may include homogenized tobacco material. Homogenized tobacco material may be formed by agglomerating particulate tobacco. The aerosol-forming substrate may include a non-tobacco-containing material. The aerosol-forming substrate may include homogenized plant-based material.

The aerosol-forming substrate may include, for example, one or more of: powder, granules, pellets, shreds, spaghettis, strips, or sheets. The aerosol-forming substrate may contain one or more of: herb leaf, tobacco leaf, fragments of tobacco ribs, reconstituted tobacco, homogenized tobacco, extruded tobacco, and expanded tobacco. The tobacco may be flue cured.

The aerosol-forming substrate may include at least one aerosol former. Suitable aerosol formers include compounds or mixtures of compounds which, in use, facilitate formation of a dense and stable aerosol and which are substantially resistant to thermal degradation at the operating temperature of the shisha device. Suitable aerosol formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine. The aerosol-former may be propylene glycol. The aerosol-forming substrate may include any suitable amount of an aerosol former. For example, the aerosol former content of the substrate may be equal to or greater than 5 percent on a dry weight basis, and preferably greater than 30 percent by weight on a dry weight basis. The aerosol former content may be less than about 95 percent on a dry weight basis. Preferably, the aerosol former content is up to about 55 percent on a dry weight basis The aerosol-forming substrate preferably includes nicotine and at least one aerosol former. In some embodiments, the aerosol former is glycerine or a mixture of glycerine and one or more other suitable aerosol formers, such as those listed above. In some embodiments, the aerosol-forming is propylene glycol.

The aerosol-forming substrate may include other additives and ingredients, such as flavourants. In some examples, the aerosol-forming substrate includes one or more sugars in any suitable amount. Preferably, the aerosol-forming substrate includes invert sugar. Invert sugar is a mixture of glucose and fructose obtained by splitting sucrose. Preferably, the aerosol-forming substrate includes between about 1 percent and about 40 percent sugar, such as invert sugar, by weight. In some example, one or more sugars may be mixed with a suitable carrier such as cornstarch or maltodextrin.

In some examples, the aerosol-forming substrate includes one or more sensory-enhancing agents. Suitable sensory-enhancing agents include flavourants and sensation agents, such as cooling agents. Suitable flavourants include natural or synthetic menthol, peppermint, spearmint, coffee, tea, spices (such as cinnamon, clove, ginger, or combination thereof), cocoa, vanilla, fruit flavours, chocolate, eucalyptus, geranium, eugenol, agave, juniper, anethole, linalool, and any combination thereof.

Any suitable amount of aerosol-forming substrate, such as molasses or tobacco substrate, may be provided in the aerosol-generating article. In some preferred embodiments, about 3 grams to about 25 grams of the aerosol-forming substrate is provided in the aerosol-generating article. The cartridge may include at least 6 grams, at least 7 grams, at least 8 grams, or at least 9 grams of aerosol-forming substrate. The cartridge may include up to 15 grams, up to 12 grams; up to 11 grams, or up to 10 grams of aerosol-forming substrate. Preferably, from about 7 grams to about 13 grams of aerosol-forming substrate is provided in the aerosol-generating article.

The aerosol-forming substrate may be provided on or embedded in a thermally stable carrier. The term "thermally stable" is used herein to indicate a material that does not substantially degrade at temperatures to which the substrate is typically heated (e.g., about 150° C. to about 300° C.). The carrier may comprise a thin layer on which the substrate deposited on a first major surface, on second major outer surface, or on both the first and second major surfaces. The carrier may be formed of, for example, a paper, or paper-like material, a non-woven carbon fibre mat, a low mass open mesh metallic screen, or a perforated metallic foil or any other thermally stable polymer matrix. Alternatively, the carrier may take the form of powder, granules, pellets, shreds, spaghettis, strips or sheets. The carrier may be a non-woven fabric or fibre bundle into which tobacco components have been incorporated. The non-woven fabric or fibre bundle may comprise, for example, carbon fibres, natural cellulose fibres, or cellulose-derivative fibres.

In some preferred embodiments, the aerosol-forming substrate may comprise tobacco, sugar and an aerosol-former. In these embodiments, the aerosol-forming substrate may comprise between 10 percent and 40 percent by weight of tobacco. In these embodiments, the aerosol-forming substrate may comprise between 20 percent and 50 percent by weight of sugar. In these embodiments, the aerosol-forming substrate may comprise between 25 percent and 55 percent by weight of aerosol-former. In some particularly preferred embodiments, the aerosol-forming substrate comprises between 20 percent and 30 percent by weight of tobacco, between 30 percent and 40 percent by weight of sugar, and between 35 percent and 45 percent by weight of aerosol-former. In some preferred embodiments, the aerosol-forming substrate may comprise about 25 percent by weight of tobacco, about 35 percent by weight of sugar and about 40 percent by weight of aerosol-former. In some preferred embodiments, the aerosol-forming substrate may comprise between about 15 percent and about 30 percent by weight of tobacco, between about 15 percent and about 30 percent by weight of sugar and between about 45 percent and about 55 percent by weight of aerosol-former. In these preferred embodiments, the tobacco may be flue cured tobacco leaf. In these preferred embodiments, the sugar may be sucrose or invert sugar. In these preferred embodiments, the aerosol-former may be propylene glycol.

It should be appreciated that features described in relation to a shisha device or an aerosol-generating article may also be applicable to a shisha system according to the disclosure.

It should also be appreciated that particular combinations of the various features described above may be implemented, supplied, and used independently.

Embodiments of the present disclosure will now be described, by way of example only, with reference to the accompanying drawings, in which.

Figure 8:
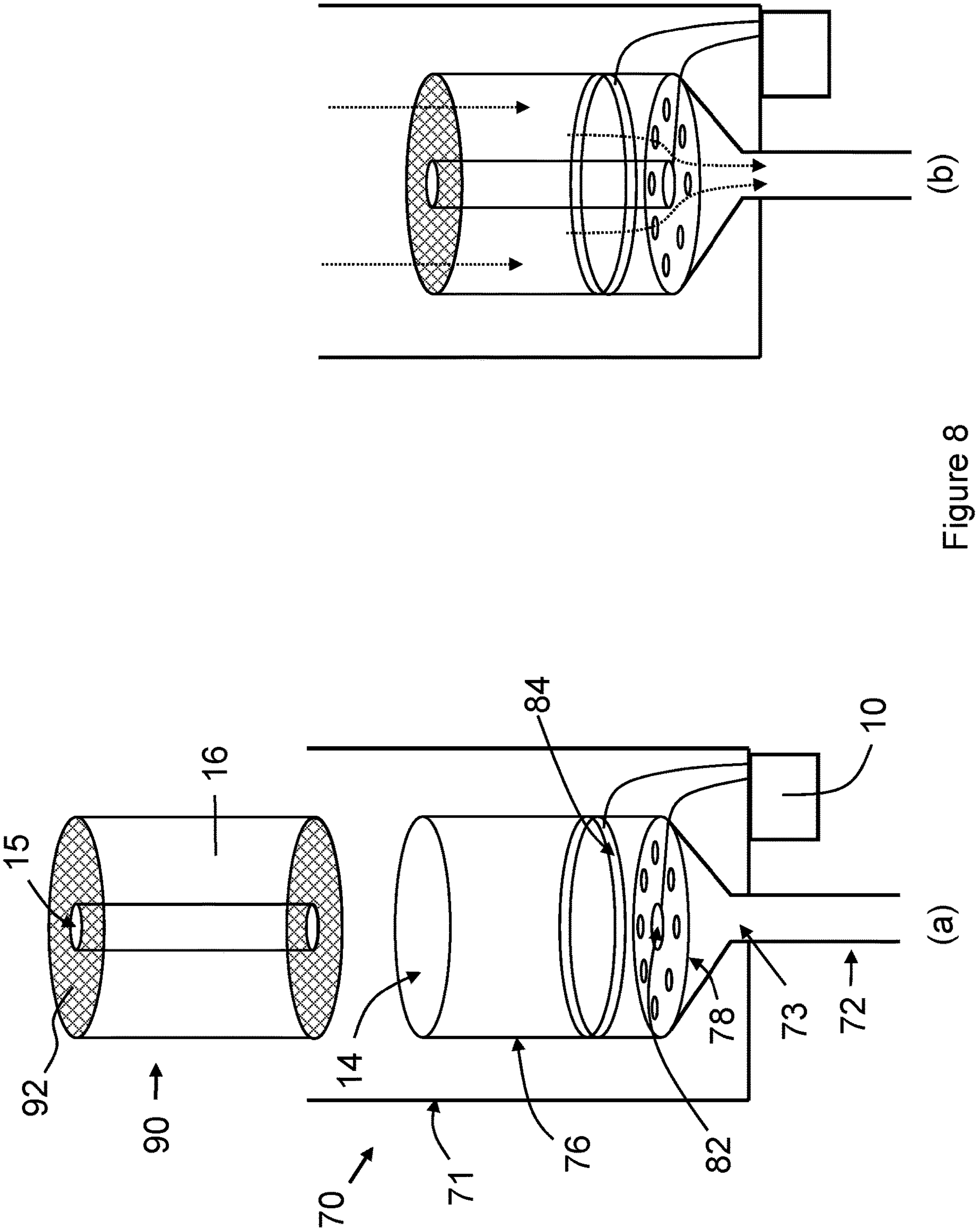
Figure 9:
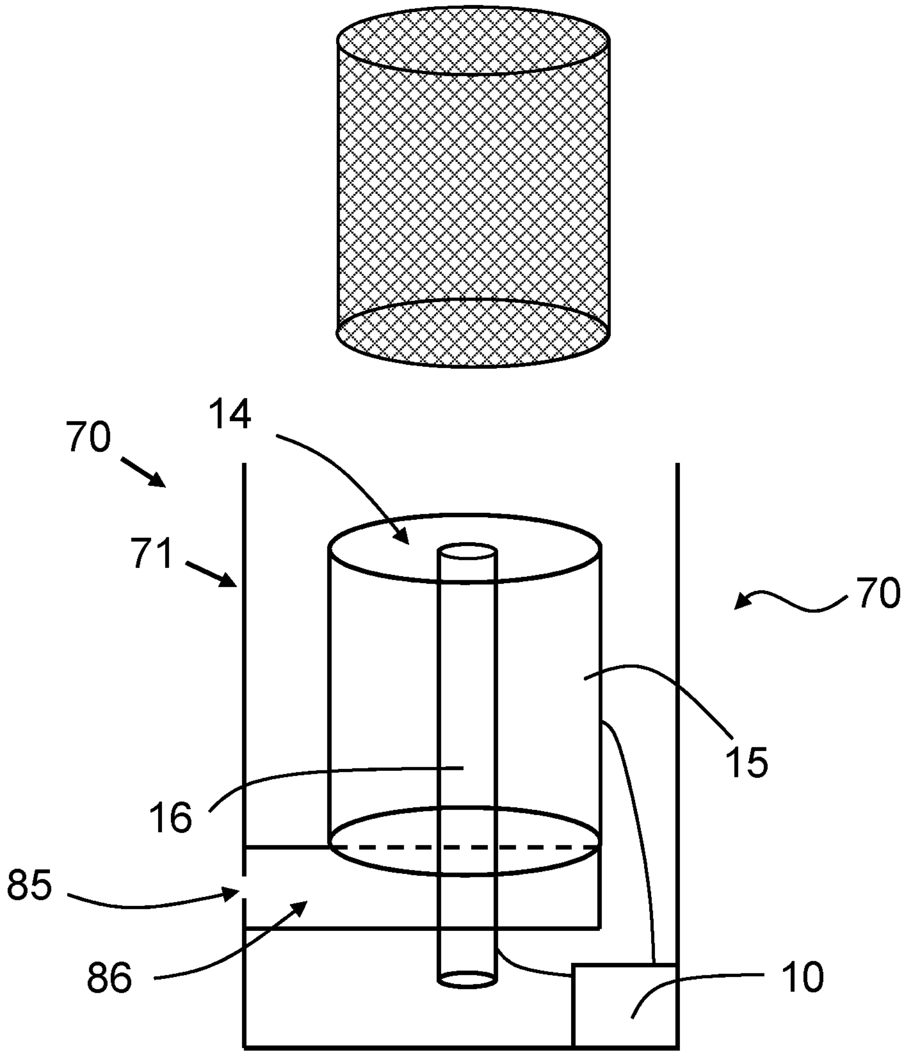
Figure 10:
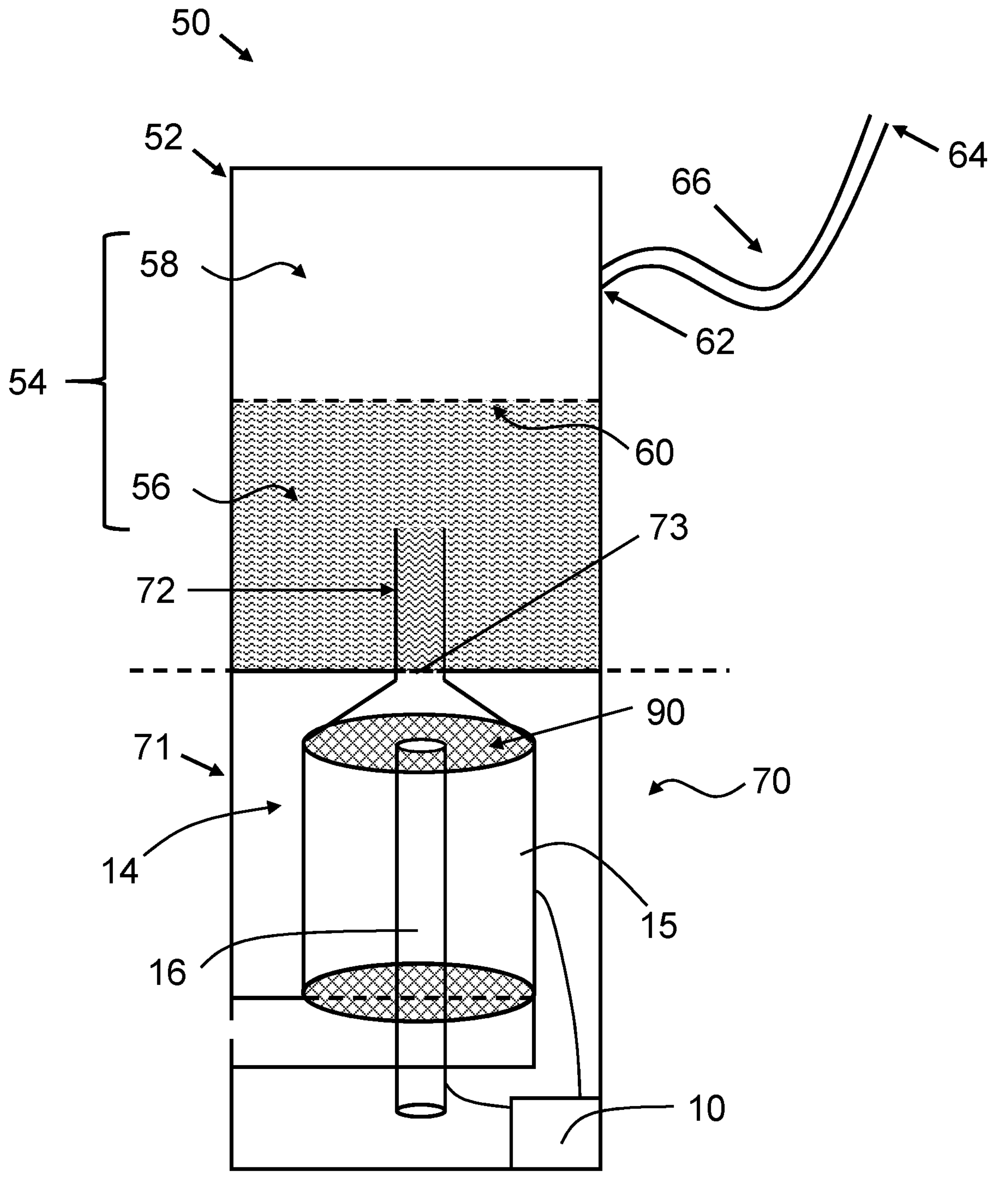

FIG. 8 is a schematic illustration of a heating unit of a shisha device and an aerosol-generating article configured for use with the shisha device according to an embodiment of the disclosure; and FIG. 9 is a schematic illustration of a heating unit of a shisha device and an aerosol-generating article configured for use with a shisha device according to an embodiment of the disclosure FIG. 10 is a schematic illustration of an embodiment of a shisha system having the heating unit of FIG. 9.

Figure 1:
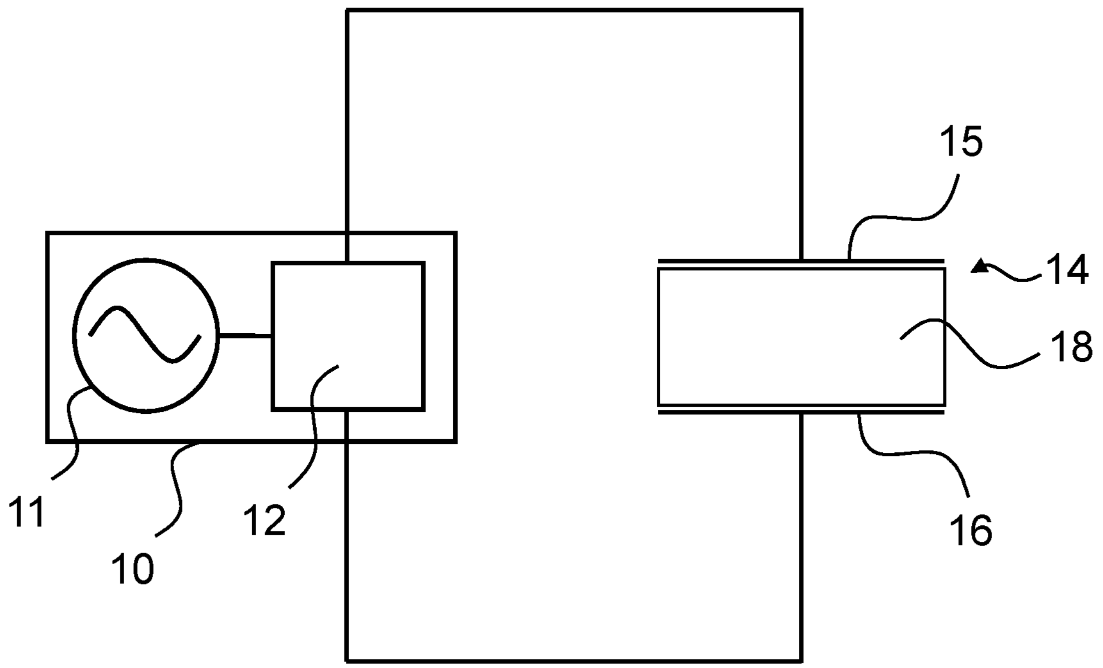
FIG. 1 is a schematic illustration of a dielectric heating system.

FIG. 1 is a schematic illustration of a system for heating using radio frequency (RF) electromagnetic radiation, sometimes referred to as dielectric heating. The system comprises an oscillation circuit 10 including a radio frequency (RF) signal generator 11 and a phase shift network 12. The system further comprises a first electrode 15 connected to a first output of the phase shift network 12, and a second electrode 16 connected to a second output of the phase shift network 12. The second electrode 16 is spaced apart from the first electrode 15 to define an article cavity 14 between the first electrode 15 and the second electrode 16. The article cavity 14 is configured to receive an aerosol-generating article 18. An aerosol-generating article 18, which is to be heated, is placed in the article cavity 14 and subjected to radio frequency electromagnetic radiation between the first electrode 15 and the second electrode 16. Polar molecules within the aerosol-generating article 18 align with the oscillating electromagnetic field and so are agitated by the electromagnetic field as it oscillates. This causes an increase in temperature of the aerosol-generating article 18. This kind of heating has the advantage that it is uniform throughout the aerosol-generating article 18 (provided that the polar molecules are uniformly distributed). It also has the advantage of reducing the likelihood of combustion of the substrate in contact with the first electrode and the second electrode compared to a conventional heating element that transfers heat to the substrate via conduction.

Figure 2:
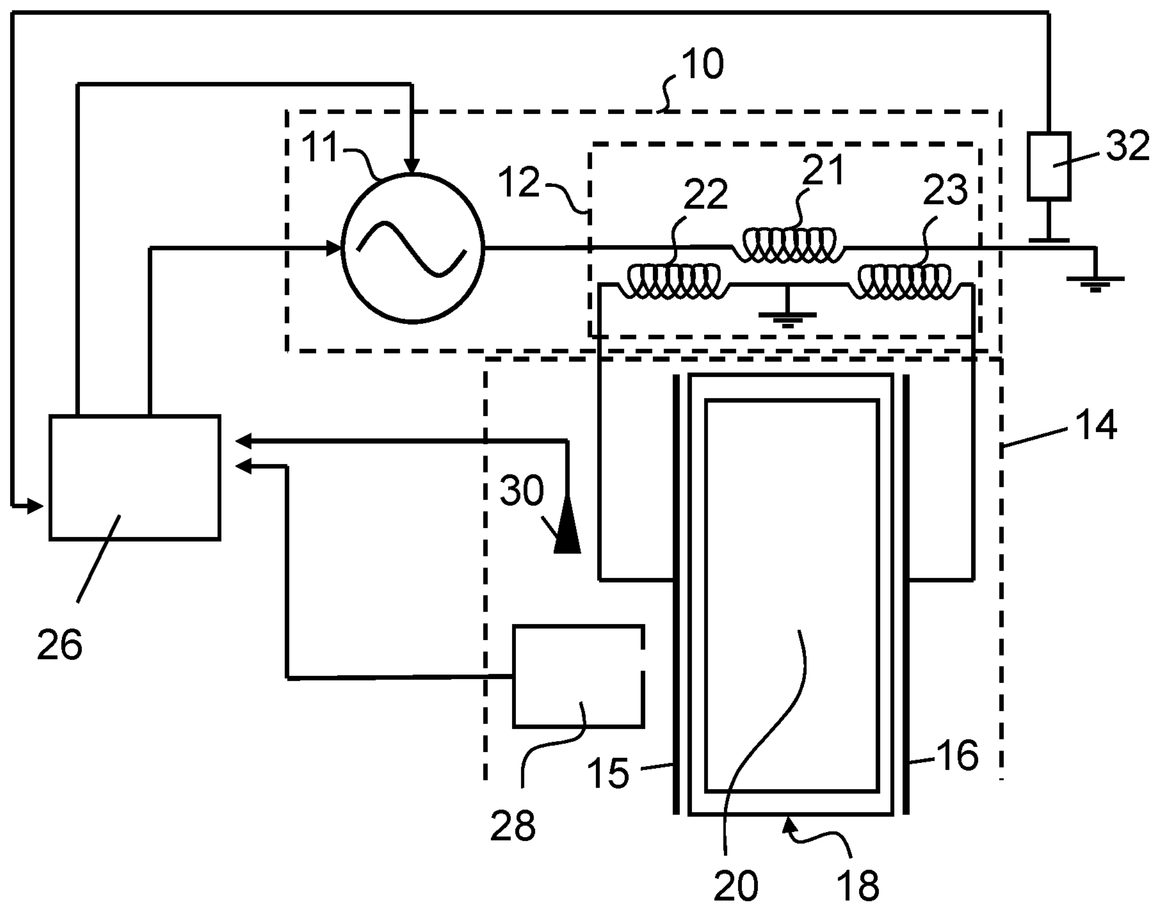
FIG. 2 is a schematic illustration of a closed-loop control system for a shisha system having a dielectric heating system according to embodiments of the disclosure.

FIG. 2 illustrates a control scheme that may be used in any of the embodiments described in FIGS. 3 to 10. As previously described, the system comprises control circuitry for the oscillation circuit. In the example of FIG. 2, the oscillation circuit 10 comprises a RF signal generator 10 and a phase shift network 12 to split the signal from the RF signal generator 10 into two equal components, 180 degrees out of phase with each other.

A first output of the oscillation circuit 10 is passed to a first electrode 15. A second output 16 of the oscillation circuit 10 is passed to a second electrode 16. The first electrode 15 and the second electrode 16 are positioned on opposite sides of an article cavity 14, spaced apart such that the first electrode 15 and second electrode 16 are not in electrical contact and such that an aerosol-generating article 18 can be positioned in the space between the first electrode 15 and the second electrode 16. An aerosol-generating article 18 is positioned in the article cavity 14, in the space between the first electrode 15 and the second electrode 16.

In more detail, the phase shift network 12 comprises a transformer having a primary winding 21, a first secondary winding 22 and a second secondary winding 23. The primary winding 21 is connected at one end to an output of the RF signal generator 11 and at the other end to ground. One end of the first secondary winding 22 is connected to the first electrode 15 and one end of the second secondary winding 23 is connected to the second electrode 16. The other ends of the first secondary winding 22 and the second secondary winding 23 are connected together, and a centre tap between the first secondary winding 22 and the second secondary winding 23 is connected to ground. When power is supplied to the oscillation circuit 10, at any instant the voltages at the first electrode 15 and the second electrode 16 are substantially equal but opposite in polarity (i.e. 180 degrees out of phase with each other).

The control circuitry comprises a microcontroller 26 that can control both the frequency and the power output of the RF signal generator 11. One or more sensors provide input to the microcontroller 26. The microcontroller 26 adjusts the frequency or the power output, or both the frequency and the power output, of the RF signal generator 11 based on the sensor inputs. In the example shown in FIG. 2, there is a temperature sensor 28 positioned to sense the temperature within the article cavity 14. A sampling antenna 30 may be provided in the article cavity 14 as an alternative, or in addition, to the temperature sensor 28. The sampling antenna 30 is configured as a receiver and can detect perturbation of the electromagnetic field in the article cavity 14, which is an indication of the efficiency of the energy absorption by the aerosol-forming substrate 20. A RF power sensor 32 is also provided to detect the power output from RF signal generator 11.

The microcontroller 26 receives signals from the RF power sensor 32, the temperature sensor 28 and the sampling antenna 30. The signals can be used to determine at least one of: whether the temperature is too low, whether the temperature is too high, if there is a fault, and if there is no substrate, or a substrate with inappropriate dielectric properties, in the article cavity 14.

Based on the determination made by the microcontroller 26, the frequency and power of the electromagnetic filed generated by the RF solid state transistor is adjusted or the electromagnetic filed is switched off. Typically, it is desirable to provide for a stable and consistent volume of aerosol, which means maintaining the aerosol-forming substrate within a particular temperature range. However, the desired target temperature may vary with time as the composition of the aerosol-forming substrate changes and the temperature of the surrounding system changes. Also, the dielectric properties of the aerosol-forming substrate change with temperature and so the electromagnetic field may need to be adjusted as temperature increases or decreases.

It should be clear that features described in relation one embodiment may be applied to other embodiments. The embodiments described provide the advantages of uniform, contactless heating of an aerosol-forming substrate in a manner that can be controlled to provide for particular, desirable aerosol properties.

The embodiments described with reference to FIGS. 3 to 10 use the basic heating and control principles illustrated in FIGS. 1 and 2.

Figure 3:
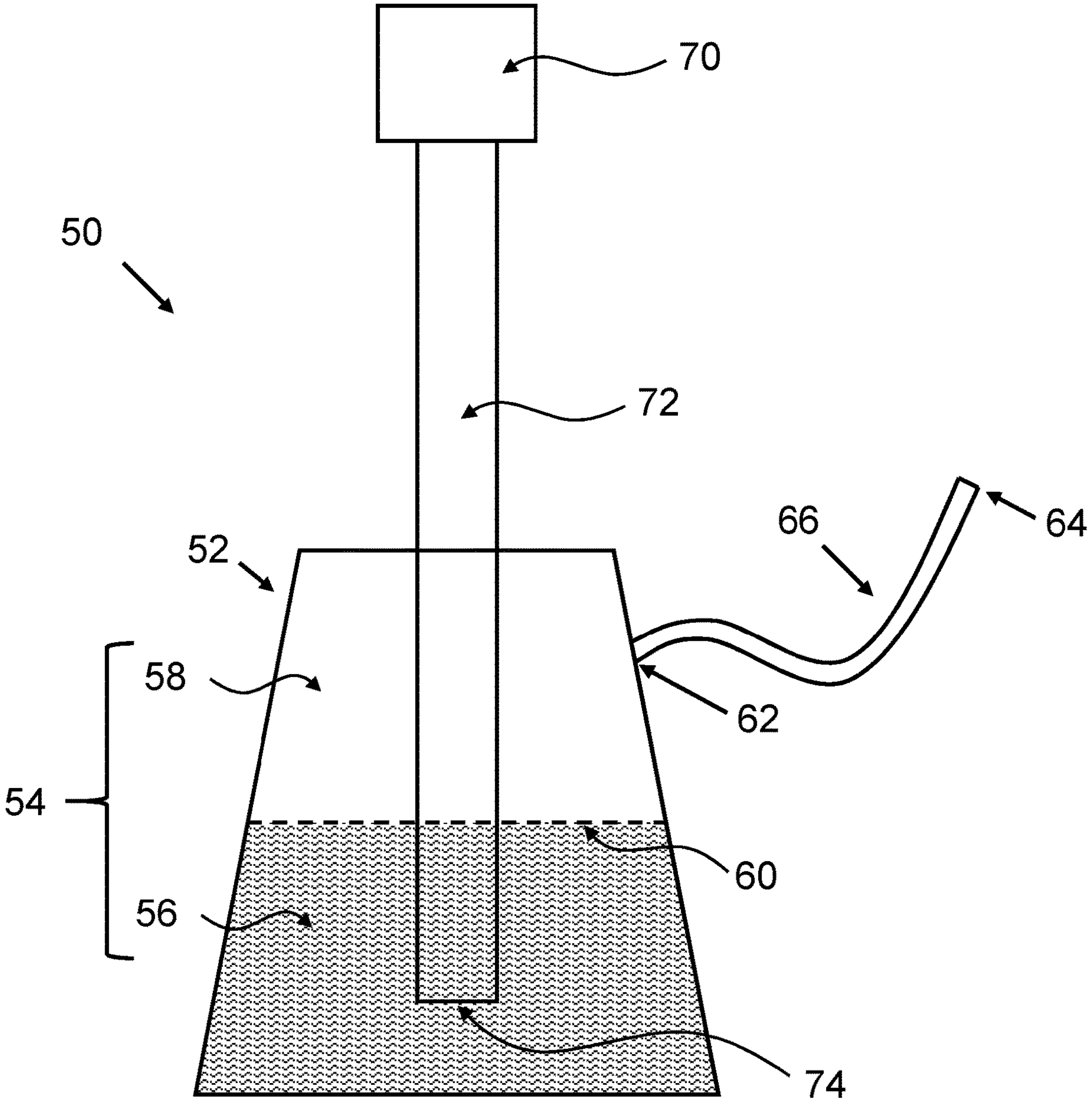
FIG. 3 is a schematic illustration of an embodiment of a shisha system having a dielectric heating system.

FIG. 3 is a schematic illustration of a shisha system according to an embodiment of this disclosure.

The shisha device 50 comprises a vessel 52 defining a liquid cavity 54. The vessel 52 is configured to retain a volume of liquid in the liquid cavity 54, and is formed from a rigid, optically transparent material, such as glass. In this embodiment, the vessel 52 has a substantially frustoconical shape, and is supported in use at its wide end on a flat, horizontal surface, such as a table or shelf. The liquid cavity 54 is divided into two sections, a liquid section 56 for receiving a volume of liquid, and a headspace 58 above the liquid section 58. A liquid fill level 60 is positioned at the boundary between the liquid section 56 and the headspace 58, the liquid fill level 60 being demarcated on the vessel 52 by a dashed line marked on an outer surface of the vessel 52. A headspace outlet 62 is provided on a side wall of the vessel 52, above the liquid fill level 60. The headspace outlet 62 enables fluid to be drawn out of the liquid cavity 54 from the headspace 58. A mouthpiece 64 is connected to the headspace outlet 62 by a flexible hose 66. A user may draw on the mouthpiece 64 to draw fluid out of the headspace 58 for inhalation.

The shisha device 50 further comprises a heating unit 70 comprising an oscillator circuit in accordance with the present disclosure. Examples of different heating units will be discussed in more detail below with reference to FIGS. 4, 5, 6, 7 and 8. The heating unit 70 is arranged above the vessel 52 by an airflow conduit 72. In this embodiment, the heating unit 70 is supported above the vessel 52 by the airflow conduit 72, however, it will be appreciated that in other embodiments the heating unit 70 may be supported above the vessel 52 by a housing of the shisha device or another suitable support. The airflow conduit 72 extends from the heating unit 70 into the liquid cavity 54 of the vessel 52. The airflow conduit 72 extends through the headspace 58, and below the liquid fill level 60 into the liquid section 58. The airflow conduit 72 comprises an outlet 74 in the liquid section 56 of the liquid cavity 54, below the liquid fill level 60. This arrangement enables air to be drawn from the heating unit 70 to the mouthpiece 64. Air may be drawn from an environment external to the device 50, into the heating unit 70, through the heating unit 70, though the airflow conduit 72 into the volume of liquid in the liquid section 56 of the liquid cavity 54, out of the volume of liquid into the headspace 58, and out of the vessel from the headspace 58 at the headspace outlet 62, through the hose 66 and to the mouthpiece 64.

In use, a user may draw on the mouthpiece 64 of the shisha device 50 to receive aerosol from the shisha device 50. In more detail, an aerosol-generating article comprising an aerosol-forming substrate can be positioned in an article cavity within the heating unit 70 of the shisha device 50. The heating unit 70 may be operated to heat the aerosol-forming substrate within the aerosol-generating article and release volatile compounds from the heated aerosol-forming substrate. When a user draws on the mouthpiece 64 of the shisha device 50, the pressure within the shisha device 50 is lowered, which draws the released volatile compounds from the aerosol-forming substrate out of the heating unit 70 and into the airflow conduit 72. The volatile compounds are drawn out of the airflow conduit 72 at the outlet 74, into the volume of liquid in the liquid section 56 of the liquid cavity 54. The volatile compounds cool in the volume of liquid and are released into the headspace 58 above the liquid fill level 60. The volatile compounds in the headspace 58 condense to form an aerosol that is drawn out of the headspace at the headspace outlet 62 and to the mouthpiece 64 for inhalation by the user.

Figure 4:
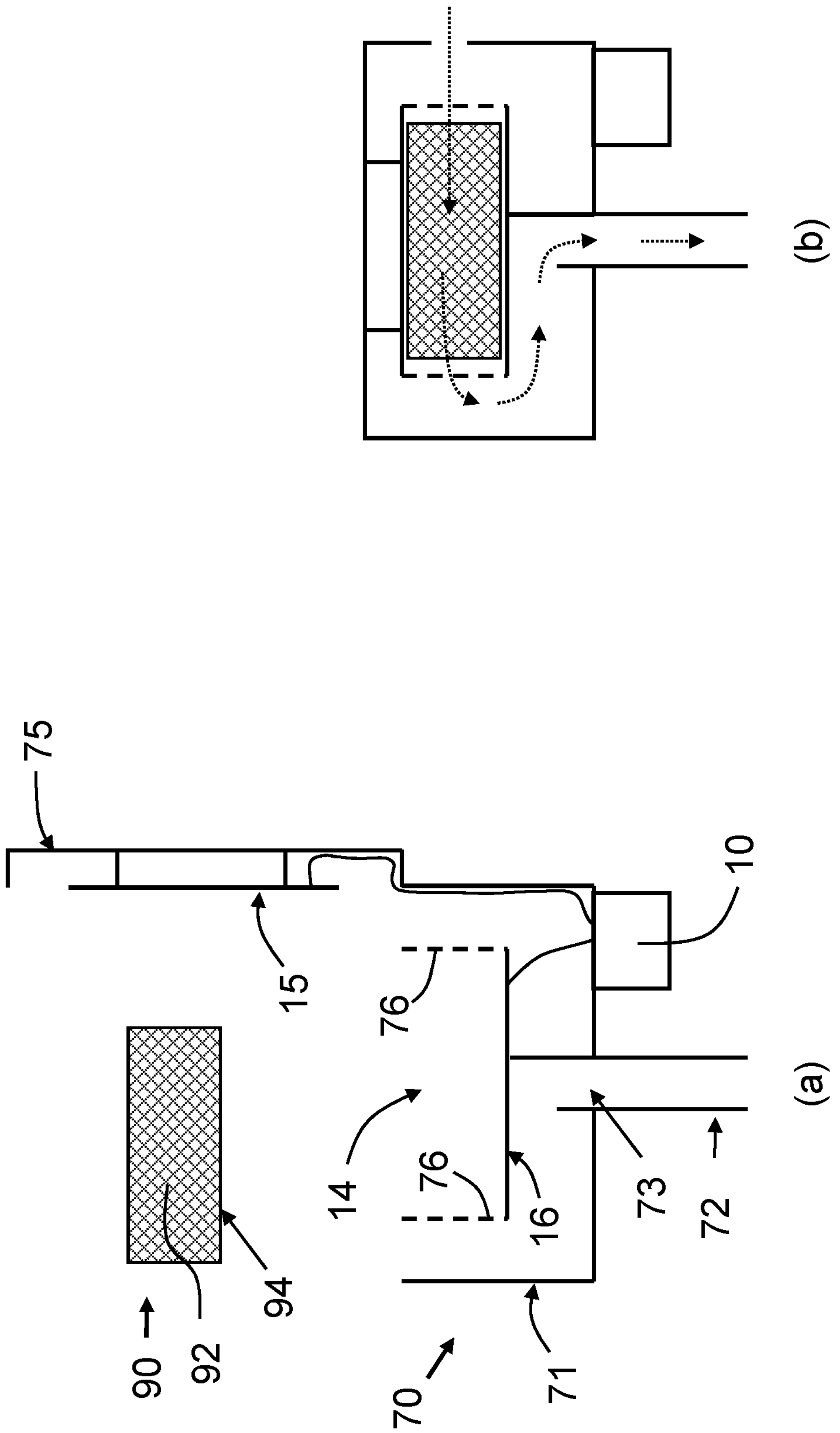
FIG. 4 is a schematic illustration of a heating unit of a shisha device and an aerosol-generating article configured for use with the shisha device according to an embodiment of the disclosure.

FIG. 4 shows schematic illustrations of a heating unit 70 of the shisha device 50 of FIG. 3 in combination with an aerosol-generating article 90, forming a shisha system according to an embodiment of this disclosure. FIG. **4*a* shows the heating unit 70 and the aerosol-generating article 90 before insertion of the aerosol-generating article 90 into an article cavity 14 of the heating unit 70. FIG. 4*b* shows the aerosol-generating article 90 received in the article cavity 14 of the heating unit 70**.

As shown in FIG. **4*a*, the heating unit 70 comprises an external housing 71. The external housing 71 forms a cylindrical tube that is open at one end for insertion of the aerosol-generating article 90, and is substantially closed at the opposite end. In this embodiment, the external housing 71 is formed from a material that is opaque to RF electromagnetic radiation, such as aluminium. However, it will be appreciated that the housing 71** does not need to be formed from a material that is opaque to RF electromagnetic radiation, but rather in some embodiments may be formed from a material that is substantially transparent to RF electromagnetic radiation, such as a ceramic material or a plastic material.

A closure 75 is moveable over the open end of the external housing 71 of the heating unit 70 to substantially close the open end. In this position, the external housing 71 and the closure 75 define a heating unit cavity. The closure 75 comprises an external housing similar to the external housing 71 of the heating unit, formed from the same material opaque to the RF electromagnetic field and sized and shaped to align and engage with the external housing 71 to close the open end. The closure 75 is rotatably connected to the external housing 71 by a hinge, and is rotatable between an open position, as shown in FIG. 4*a*, and a closed position, as shown in FIG. 4*b*. When the closure 75 is in the open position, the open end of the external housing 71 is open for insertion of an aerosol-generating article 90 into the heating unit cavity, and for removal of the aerosol-generating article 90 from the heating unit cavity. When the closure 75 is in the closed position, the heating unit cavity is surrounded by material that is opaque to a RF electromagnetic field, such that a RF electromagnetic field is unable to propagate from the heating unit cavity.

A side wall of the external housing 71 comprises an air inlet (shown in FIG. 4*b*), for enabling ingress of ambient air into the heating unit cavity.

The heating unit 70 is arranged above the vessel 52 of the shisha device 50 on the airflow conduit 72. The airflow conduit 72 extends into the heating unit cavity and is fixedly attached to the substantially closed end of the external housing 71 of the heating unit 70. It will be appreciated that in other embodiments, the heating unit 70 may be removably attached to the airflow conduit 72, such that the heating unit 70 may be removed for cleaning or replacement if necessary. An opening 73 is provided in the substantially closed end of the external housing 71 to fluidly connect the resonating cavity 80 to the airflow conduit 72.

An article cavity 14 is defined within the heating unit cavity, for receiving the aerosol-generating article 90. The article cavity 14 is defined by a first electrode 15, a second electrode 16, opposite the first electrode 15, and a side wall 76 extending between the first electrode 15 and the second electrode 16. The article cavity 14 is configured to receive the aerosol-generating article 90, and has a shape and size that is complementary to the aerosol-generating article 90. The first electrode 15 and the second electrode 16 are substantially identical planar electrodes with a substantially circular shape. The first electrode 15 is secured to an inner surface of the closure 15, such that the first electrode 15 moves with the closure 75, and the second electrode 16 and side wall 76 are supported in the heating unit cavity by the airflow conduit 72. The second electrode 16 forms a base of the article cavity 14, the side wall 76 forms a side wall of the article cavity 14, and the first electrode 15 forms a top wall of the article cavity 14 when the closure 75 is in the closed position. The side wall 76 is formed from an electrically insulative material, in this embodiment a ceramic material, such as PEEK. Accordingly, the side wall 76 ensures that the first electrode 15 and the second electrode 16 do not come into electrical contact with each other.

The side wall 76 of the article cavity 14 is gas permeable, having slots formed therein to enable air to flow through the article cavity 14, from one side to the other, as shown in FIG. 4*b*. Accordingly, the heating unit 70 is configured such that air may be drawn into the heating unit cavity through the air inlet, through the article cavity 14 through the slots in the side wall 76 of the article cavity 14, and from the heating unit cavity into the airflow conduit 72, through the opening 73. The heating unit 70 further comprises an oscillation circuit 10. The oscillation circuit 10 is connected to a power supply (not shown) and control circuitry (not shown) of the shisha device, the control circuitry being configured to control the supply of power from the power supply to the oscillation circuit 10. In this embodiment, the power supply is a rechargeable lithium ion battery, and the shisha device 50 comprises a power connector that enables the shisha device 50 to be connected to a mains power supply for recharging the power supply. Providing the shisha device 50 with a power supply, such as a battery, enables the shisha device 50 to be portable and used outdoors or in locations in which a mains power supply is not available.

The first electrode 15 is electrically connected to the oscillation circuit 10 by a flexible circuit. The second electrode 16 is also electrically connected to the oscillation circuit 10.

The aerosol-generating article 90 comprises an aerosol-forming substrate 92. In this embodiment, the aerosol-forming substrate 92 is a shisha substrate, comprising molasses and tobacco. The aerosol-forming substrate 92 is encased within a wrapper 94, formed from a gas permeable, electrically insulating material, such as tipping paper. The aerosol-generating article 90 has a substantially cylindrical shape, similar to a hockey puck, which is complimentary to the shape of the article cavity 14 of the shisha device 50.

As shown in FIG. 4*b*, when the aerosol-generating article 90 is received in the article cavity 14 of the heating unit 70, a circular base of the aerosol-generating article 90 contacts the second electrode 16 of the article cavity 14, and the sides of the aerosol-generating article 90 contact the side wall 76 of the article cavity 14. When the closure 75 is arranged in the closed position, the circular top of the aerosol-generating article 90 contacts the first electrode 15 of the article cavity 14. In this arrangement, the first electrode 15, second electrode 16 and aerosol-generating article 90 form a capacitor, with the aerosol-forming substrate 90 defining the dielectric material between the first electrode 15 and the second electrode 16.

When a user draws on the mouthpiece 64 of the shisha device 50, air is drawn into the shisha device 50 through the air inlet of the external housing 71. An airflow path through the aerosol-generating article 90 and heating unit 70 is shown by the arrows in FIG. 4*b*. Air is drawn into the heating unit cavity through the air inlet of the external housing 71, and from the heating unit cavity into the aerosol-generating article 90 through the side wall 76 of the article cavity 14. Air is drawn through the aerosol-forming substrate 92 and back into the heating unit cavity through an opposite portion of the side wall 76 of the article cavity 14, and from the heating unit cavity into the airflow conduit 72 through the opening 73 in the external housing 71 of the heating unit 70.

In use, power is supplied to the oscillation circuit 10 from the power supply when a user activates the shisha device 50. In this embodiment, the shisha device is activated by a user pressing an activation button (not shown) provided on an external surface of the heating unit 70. It will be appreciated that in other embodiments, the shisha device may be activated in another manner, such as on detection of a user drawing on the mouthpiece 64 by a puff sensor provided on the mouthpiece 64. When power is supplied to the oscillation circuit 10, the oscillation circuit generates two substantially equal, out of phase RF electromagnetic signals with a frequency of between 1 Hz and 300 MHz. One of the signals is supplied to the first electrode 15, and the other signal is supplied to the second electrode 16.

The RF electromagnetic signals supplied to the first electrode 15 and the second electrode 16 establish an alternating RF electromagnetic field in the article cavity 14, which dielectrically heats the aerosol-forming substrate 90, which releases volatile compounds. As described above, the temperature in the article cavity 14 can be regulated using a feedback control mechanism. The temperature inside the article cavity 14 can be sensed, or another parameter indicative of the temperature inside the substrate cavity can be sensed, to provide a feedback signal to the control circuitry of the shisha device 50. The control circuitry is configured to adjust the frequency or amplitude, or both the frequency and the amplitude, of the RF electromagnetic field in order to maintain the temperature inside the article cavity 14 within a desired temperature range.

When a user draws on the mouthpiece 64 of the shisha device 50, the volatile compounds released from the heated aerosol-forming substrate 90 are entrained in the airflow through the aerosol-generating article 90 and are drawn out of the aerosol-generating article 90, through the heating unit 70 and into the airflow conduit 72 through the opening 73. From the airflow conduit 72, the volatile compounds are drawn through the shisha device 50 to and out of the mouthpiece 66 as described above.

Figure 5:
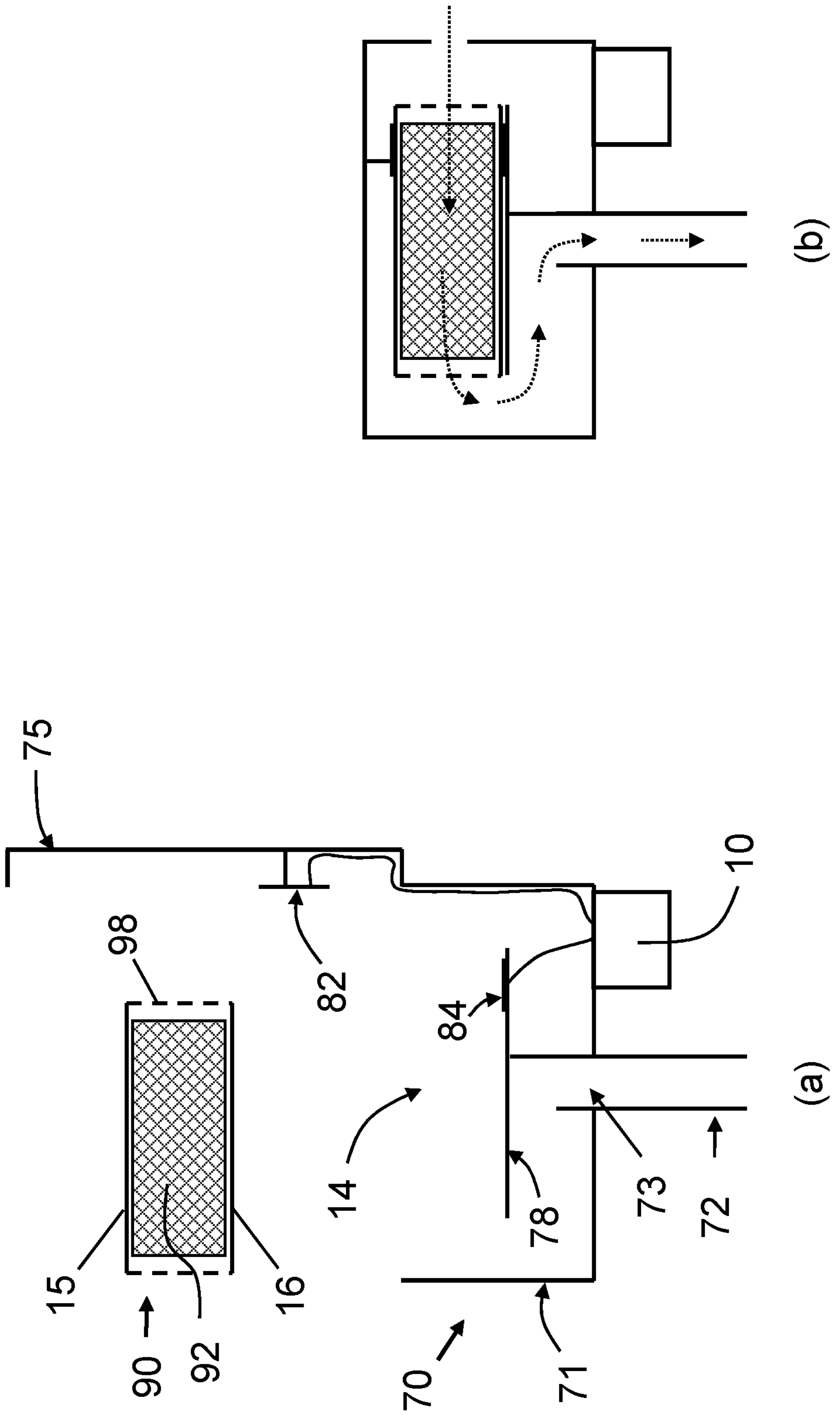
FIG. 5 is a schematic illustration of heating units of different embodiments of a shisha device according to embodiments of the disclosure.

FIG. 5 shows a heating unit 70 and aerosol-generating article 90 for a shisha device according to other embodiments of this disclosure. The heating unit 70 shown in FIG. 5 is substantially similar to the heating unit 70 shown in FIG. 4, and like reference numerals are used to represent like features. FIG. 5*a* shows the heating unit 70 and the aerosol-generating article 90 before insertion of the aerosol-generating article 90 into an article cavity 14 of the heating unit 70. FIG. 5*b* shows the aerosol-generating article 90 received in the article cavity 14 of the heating unit 70.

The heating unit 70 shown in FIG. 5 differs from the heating unit 70 shown in FIG. 4 in that the heating unit 70 shown in FIG. 5 does not comprise the first electrode 15 and the second electrode 16. Instead, in this embodiment the aerosol-generating article 90 comprises the first electrode 15 and the second electrode 16, and the heating unit 70 comprises a first electrical contact 82 and a second electrical contact 84.

The first electrical contact 82 is secured to an inner surface of the closure 75, in a similar position to the first electrical contact 15 of the embodiment of FIG. 4. The second electrical contact 84 is secured to a base 78 supported in the external housing 71 in a position similar to the second electrode 16 of the embodiment of FIG. 4. In this embodiments, the article cavity is merely defined by the base 78, and does not comprise a side wall. The first electrical contact 82 and the second electrical contact 84 are substantially identical, and comprise circular sheets of metal with a diameter that is significantly smaller than the diameter of the aerosol-generating article 90. The first electrical contact and the second electrical contact are electrically connected to the oscillation circuit 10.

In this embodiment, the aerosol-generating article 90 has a substantially similar cylindrical form to the aerosol-generating article 90 of the embodiment of FIG. 4. However, in this embodiment, the aerosol-forming substrate 92 is not wrapped in a wrapper, but rather is contained within a container. Circular bottom and top walls of the container are formed from an electrically conductive material, typically metal. The circular top wall forms the first electrode 15, and the circular bottom wall forms the second electrode 16. A side wall 98 extends between the periphery of the bottom wall and the periphery of the top wall, and is formed from an electrically insulative material, such as a plastics material, which ensures that the bottom and top walls do not come into electrical contact. A plurality of slots are provided in the side wall 98, to enable air to flow into and out of the aerosol-generating article 90.

As shown in FIG. 5*b*, when the aerosol-generating article 90 is received in the article cavity 14, and the closure 75 is rotated into the closed position, the first electrical contact 82 contacts the first electrode 15 and electrically connects the first electrode 15 to the oscillation circuit 10, and the second electrical contact 82 contacts the second electrode 15 and electrically connects the second electrode 15 to the oscillation circuit 10.

Also as shown in FIG. 4*b*, in use ambient air is drawn into the heating unit 70 through an air inlet, and into the aerosol-generating article 90 through the slots in the side wall 98. Air is drawn out of the aerosol-generating article 90 through the slots in the side wall 98 and into the airflow conduit 72, where the air passes into the vessel of the shisha device.

Figure 6:
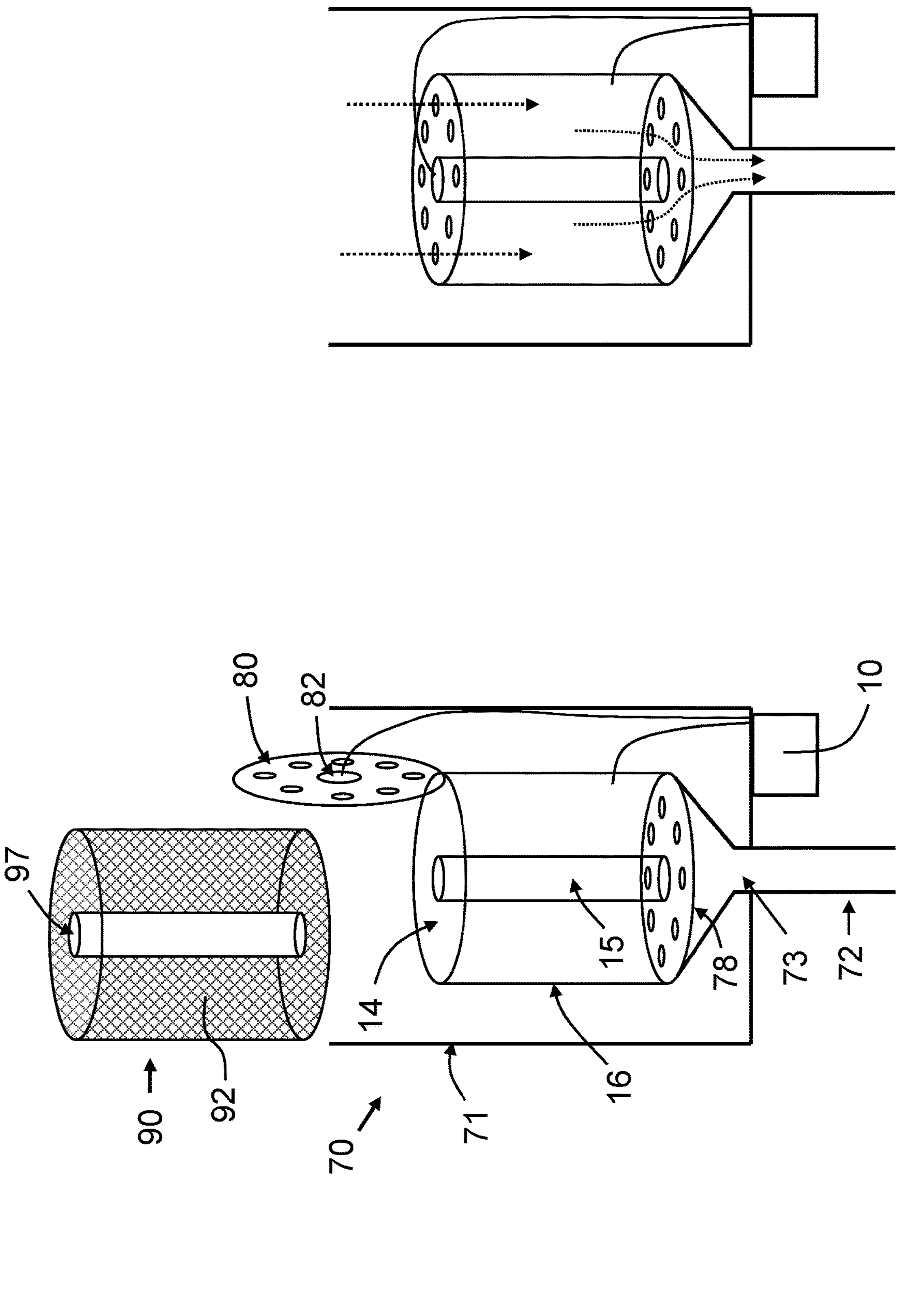
FIG. 6 is a schematic illustration of a heating unit of a shisha device and an aerosol-generating article configured for use with the shisha device according to an embodiment of the disclosure.

FIG. 6 shows a heating unit 70 for a shisha device and an aerosol-generating article 90, forming a shisha system according to another embodiment of this disclosure. The heating unit 70 and aerosol-generating article 90 shown in FIG. 6 are substantially similar to the heating unit 70 and aerosol-generating article 90 shown in FIG. 4, and like reference numerals are used to represent like features. FIG. 6*a* shows the heating unit 70 and the aerosol-generating article 90 before insertion of the aerosol-generating article 90 into an article cavity 14 of the heating unit 70. FIG. 6*b* shows the aerosol-generating article 90 received in the article cavity 14 of the heating unit 70.

The heating unit 70 shown in FIG. 6 differs from the heating unit 70 shown in FIG. 4 in that the first electrode 15 comprises an elongate, cylindrical electrode, and the second electrode 16 comprises an elongate, tubular electrode that circumscribes the first electrode 15.

The article cavity 14 is defined between the first electrode 15, the second electrode 16, and a base 78, forming an elongate annular cavity that is open at one end and substantially closed at the opposite end. The base 78 is formed from an electrically insulating material, such as PEEK, and comprises a plurality of slots to enable air to flow out of the article cavity 14. The base 78 is supported above a flared end of the airflow conduit 72, such that air flowing out of the article cavity 14 flows into the airflow conduit 72, as shown in FIG. 5*b*. In some embodiments, the flared end of the airflow conduit 72 is an integral part of the airflow conduit 72, however, in this embodiment, the flared end of the airflow conduit 72 is an integral part of the heating unit 70, and is removable from the airflow conduit with the heating unit 70.

The heating unit 70 shown in FIG. 6 also differs from the heating unit 70 shown in FIG. 4 in that the external housing 71 does not comprises a closure, but rather the article cavity 14 comprises a closure 80, which is hingedly mounted to the second electrode 16. The closure 80 is movable between an open position, as shown in FIG. 6*a*, to enable the aerosol-generating article to be inserted in the article cavity 14, and a closed position, as shown in FIG. 6*b*, for closing the open end of the article cavity 14. The closure 80 is similar to the base 78, in that it is formed from an electrically insulative material, such as PEEK, and comprises a plurality of slots to enable air to enter the article cavity 14 when the closure 80 is in the closed position. The closure 80 further comprises an electrical contact 82, centrally positioned on the closure, for contact with the first electrode 15 when the closure 80 is in the closed position, electrically connecting the first electrode 15 to the oscillation circuit 10. The electrical contact 82 is electrically connected to the oscillation circuit via a flexible circuit. The outer surface of the second electrode 16 is also electrically connected to the oscillation circuit 10.

In this embodiment, the aerosol-generating article 90 has an elongate, tubular shape that is complementary to the shape of the article cavity 14. In particular, the aerosol-forming substrate 92 comprises an inner passage 97 that is complementary in size and shape to the first electrode 15. When the aerosol-generating article 90 is received in the article cavity 14, the inner surface of the inner passage 97 of the aerosol-generating article 90 contacts the outer surface of the first electrode 15, and the outer surface of the aerosol-generating article 90 contacts the inner surface of the second electrode 16.

Figure 7:
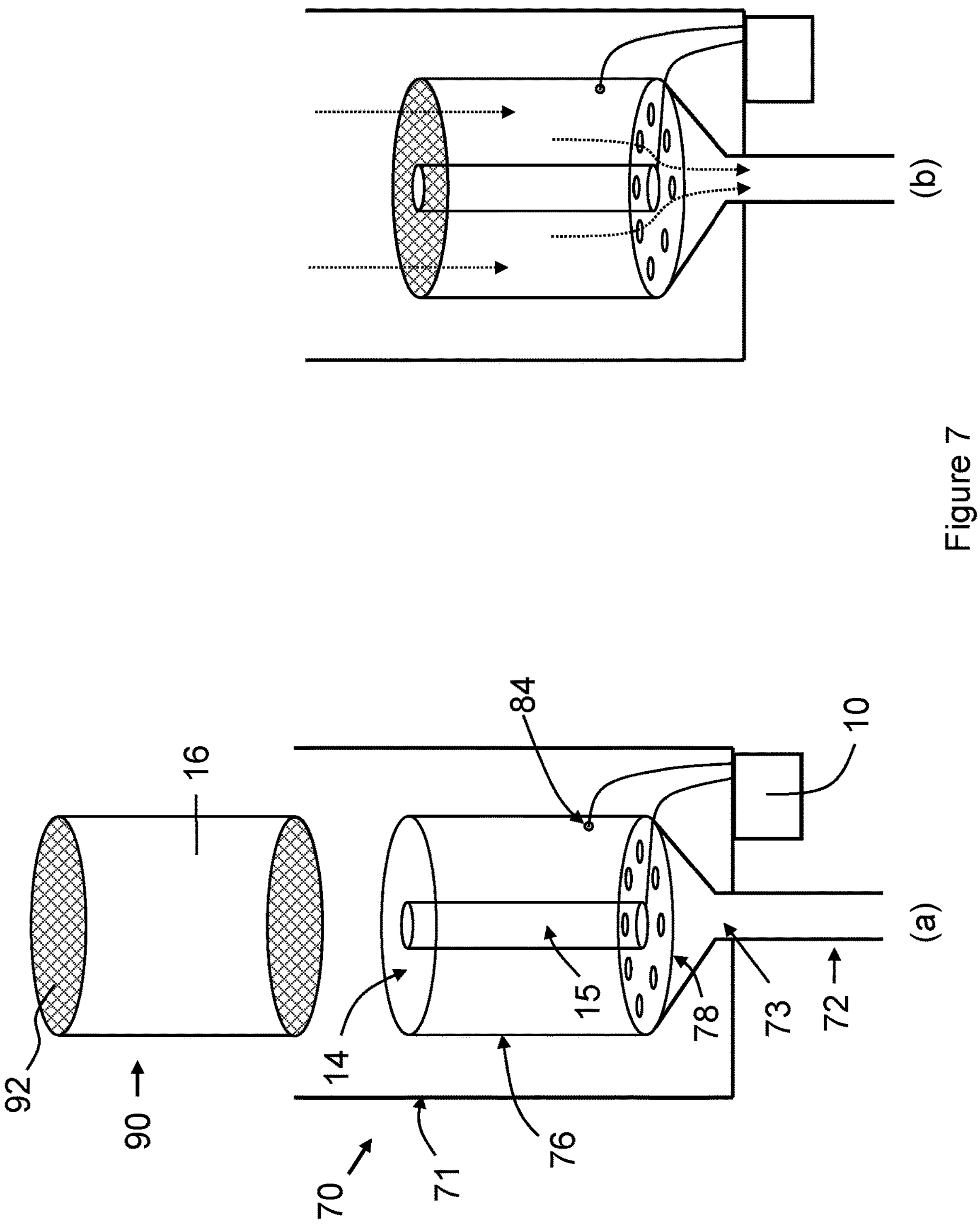
FIG. 7 is a schematic illustration of a heating unit of a shisha device and an aerosol-generating article configured for use with the shisha device according to an embodiment of the disclosure.

FIG. 7 shows a heating unit 70 for a shisha device and an aerosol-generating article 90, forming a shisha system according to another embodiment of this disclosure. The heating unit 70 and aerosol-generating article 90 shown in FIG. 7 are substantially similar to the heating unit 70 and aerosol-generating article 90 shown in FIG. 6, and like reference numerals are used to represent like features. FIG. 7*a* shows the heating unit 70 and the aerosol-generating article 90 before insertion of the aerosol-generating article 90 into an article cavity 14 of the heating unit 70. FIG. 7*b* shows the aerosol-generating article 90 received in the article cavity 14 of the heating unit 70.

The heating unit 70 shown in FIG. 7 differs from the heating unit 70 shown in FIG. 6 in that the heating unit 70 of FIG. 7 does not comprise the second electrode 16, but rather comprises a tubular side wall 76, formed from an electrically insulating material, such as PEEK, with an electrical contact 84 arranged at an inner surface of the side wall 76. The electrical contact 84 is a substantially point contact, electrically connected to the oscillation circuit 10.

The heating unit 70 shown in FIG. 7 differs from the heating unit 70 shown in FIG. 6 in that the heating unit 70 of FIG. 7 does not comprise a closure.

The aerosol-generating article 90 shown in FIG. 7 differs from the aerosol-generating article 90 shown in FIG. 6 in that the aerosol-generating article 90 of FIG. 7 comprises the second electrode 16, in the form of an electrically conductive wrapper circumscribing the cylindrical outer surface of the aerosol-forming substrate 92. In addition, the aerosol-generating article 90 of FIG. 7 does not comprise an inner passage. As such, the first electrode 15 is configured to penetrate the aerosol-forming substrate 92 when the aerosol-generating article 90 is received in the article cavity 14.

When the aerosol-generating article 90 is received in the article cavity 14, the second electrode 16 contacts the electrical contact 84 on the inner surface of the cylindrical side wall 76, and electrically connects the second electrode 16 to the oscillation circuit 10.

FIG. 8 shows a heating unit 70 for a shisha device and an aerosol-generating article 90, forming a shisha system according to another embodiment of this disclosure. The heating unit 70 and aerosol-generating article 90 shown in FIG. 8 are substantially similar to the heating unit 70 and aerosol-generating article 90 shown in FIG. 7, and like reference numerals are used to represent like features. FIG. 8*a* shows the heating unit 70 and the aerosol-generating article 90 before insertion of the aerosol-generating article 90 into an article cavity 14 of the heating unit 70. FIG. 8*b* shows the aerosol-generating article 90 received in the article cavity 14 of the heating unit 70.

The heating unit 70 shown in FIG. 8 differs from the heating unit 70 shown in FIG. 7 in that the heating unit 70 of FIG. 8 does not comprise the first electrode 15 or the second electrode 16, but rather comprises a first electrical contact 82 and a second electrical contact 84. The first electrical contact 82 is arranged centrally at the base 78, and is substantially similar to the electrical contact 82 on the closure 80 of the embodiment of FIG. 6. The second electrical contact 84 is a ring contact circumscribing the inner surface of the side wall 76.

The aerosol-generating article 90 shown in FIG. 8 differs from the aerosol-generating article 90 shown in FIG. 7 in that the aerosol-generating article 90 of FIG. 7 comprises the first electrode 15 and the second electrode 16. The first electrode 15 comprises an elongate, cylindrical electrode, extending centrally through the aerosol-forming substrate 92. The second electrode 16 comprises an electrically conductive wrapper circumscribing the cylindrical outer surface of the aerosol-forming substrate 92.

When the aerosol-generating article 90 is received in the article cavity 14, an end of the first electrode 15 of the aerosol-generating article 90 contacts the first electrical contact 82 at the base 78 of the article cavity 14, electrically connecting the first electrode 15 to the oscillation circuit 10, and the second electrode 16 of the aerosol-generating article contacts the second electrical contact 84 on the inner surface of the cylindrical side wall 76, electrically connecting the second electrode 16 to the oscillation circuit 10.

FIGS. 9 and 10 show a shisha system according to another embodiment of this disclosure. The shisha system is similar to the shisha system shown in FIG. 3, and like reference numerals are used to represent like features.

The shisha device 50 comprises a vessel 52 defining a liquid cavity 54, which is divided into two sections, a liquid section 56 comprising a volume of liquid, and a headspace 58 above the liquid section. In this embodiment, the vessel 52 is substantially cylindrical. A liquid fill level 60 is defined at the boundary between the liquid section 56 and the headspace 58, and is demarcated by a dashed line 60 on an external surface of the vessel 52. A headspace outlet 62 is provided on a side wall of the vessel 52, above the liquid fill level, and is configured to enable fluid to be drawn out of the liquid cavity at the headspace 58. A mouthpiece 64 is connected to the headspace outlet 62 by a flexible hose 66.

The vessel 52 is arranged on a heating unit 70, which in this embodiment is a cylindrical unit with a diameter substantially equal to that of the vessel 52. Accordingly, when the vessel 52 and heating unit 70 are arranged together for use, the shisha device 50 forms a substantially cylindrical unit.

The heating unit 70 is removably attachable to the vessel 52 by a screw thread (not shown), and is shown separate from the vessel 52 in FIG. 9. The heating unit 70 is substantially similar to the heating unit shown in FIG. 6, and like reference numerals will be used to describe like features.

The heating unit 70 comprises an external housing 71 formed from a material that is opaque to RF electromagnetic radiation. The external housing 71 forms a cylindrical tube that is substantially closed at one end, and open at the other end.

An article cavity 14 is defined within the external housing 71, between a tubular first electrode 15 and a cylindrical second electrode 16. The tubular first electrode 15 comprises a sheet electrode bent into a cylindrical form, which defines a cylindrical inner passage. The cylindrical second electrode 16 extends within the inner passage of the first electrode 15, and is aligned coaxially with the first electrode 15, such that the article cavity 14 is substantially annular. The diameter of the inner passage of the first electrode 15 is substantially the same as the diameter of the aerosol-generating article 90, such that the inner surface of the first electrode 15 contacts the outer surface of the aerosol-generating article 90 when the aerosol-generating article 90 is received in the article cavity 14. The second electrode 16 is configured to penetrate the aerosol-generating article 90 when the aerosol-generating article 90 is received in the article cavity 14. By penetrating the aerosol-generating article 90, the second electrode 16 contacts the aerosol-forming substrate 92 of the aerosol-generating article 90 when the aerosol-generating article 90 is received in the article cavity 14.

The article cavity 14 is open at the same end as the open end of the external housing 71, to enable the aerosol-generating article 90 to be inserted into the article cavity 14, and removed from the article cavity 14, at this end. The opposite end of the article cavity 14 is substantially closed to correctly locate the aerosol-generating article 90 in the article cavity 14.

An air inlet 85 is provided in the external housing 71, and an airflow passage extends between the air inlet 85 and the substantially closed end of the article cavity 14. The substantially closed end of the article cavity 14 comprises a plurality of slots that enable air to be drawn into the article cavity 14 from the airflow passage 86.

An oscillation circuit 10 is provided in the heating unit 70, beneath the article cavity 14 and airflow passage 86. The first electrode 15 and the second electrode 16 are electrically connected to the oscillation circuit 10, such that the oscillation circuit may provide an oscillating voltage to each of the first electrode 15 and the second electrode 16. An outer surface of the first electrode 15 is electrically connected to the oscillation circuit 10. A proximal end of the second electrode 16, extending beyond the substantially closed end of the article cavity 14, and through the airflow passage 86, is electrically connected to the oscillation circuit 10.

The oscillation circuit 10 is connected to control circuitry (not shown) and a lithium ion battery (not shown), which are arranged and configured to control the supply of power to the oscillation circuit 10 to control the RF alternating voltage generated by the oscillation circuit 10.

As shown in FIG. 10, an airflow conduit 72 extends from the vessel 52 into the article cavity 14 and fluidly connects the article cavity 14 to the liquid section 56 of the vessel 52. The airflow conduit 72 extends to a position in the liquid section 56 below the liquid fill level 60. To prevent liquid from the liquid section 56 flowing into the article cavity 14 through the airflow conduit 72 under the influence of gravity, a one way valve (not shown) is arranged in the airflow conduit 72 at the opening 73 between the heating unit 70 and vessel 52. The one way valve does not permit fluid to flow from the vessel 52 into the heating unit 70, and also requires a minimum pressure to be reached before fluid is able to flow from the heating unit 70 to the vessel 52. The end of the airflow conduit 72 extending into the heating unit 70 flares outwardly to contact the periphery of the open end of the article cavity 14. The flared end of the airflow conduit 72 may be formed from an elastomeric material, such as silicon, such that the flared end of the airflow conduit 72 forms an airtight seal with the periphery of the open end of the article cavity 14.

In use, when a user draws on the mouthpiece 64, ambient air is drawn into the shisha device 50 through the air inlet 85 and the airflow passage 86 into the article cavity 14. A puff sensor (not shown), provided in the article cavity 14 and connected to the control circuitry and battery, senses that a user is drawing on the mouthpiece 64 as air flows into the article cavity 14. When the puff sensor detects a user drawing on the mouthpiece 64, the control circuitry supplies power from the battery to the oscillation circuit 10, causing a first RF alternating voltage to be supplied to first electrode 15 and a second RF alternating voltage, 180 degrees out of phase with the first RF alternating voltage, to be supplied to the second electrode 16, heating heat the aerosol-forming substrate in the aerosol-generating article 90 in the article cavity 14. Volatile compounds are released from the heated aerosol-forming substrate. The air being drawn into the article cavity 14 entrains the released volatile compounds, and the entrained volatile compounds are drawn into the airflow conduit 72, through the one-way valve, and into the liquid section 56 of the vessel 52. The volatile compounds cool in the volume of liquid in the liquid section 56, and are released from the liquid into the headspace 58, where they condense to form an aerosol. The aerosol is drawn out of the headspace 58 through the headspace outlet 62, along the hose 66 and to the mouthpiece 64 for inhalation by the user.

It will be appreciated that the embodiments described above are exemplary embodiments only, and various other embodiments according with this disclosure are also envisaged. For example, it will be appreciated that the heating unit embodiments described above may be used with any suitable design of shisha device, such as the devices shown in FIGS. 3 and 10. For example, it will also be appreciated that vessels, aerosol-forming articles and any other features of shisha systems according to this disclosure may be any other shape and size, as desired. For example, the liquid within the liquid sections of the shisha devices is preferably water, but may be another suitable liquid.

The invention claimed is:

1. A shisha system comprising:
- an aerosol-generating article comprising an aerosol-forming substrate;
- a first electrode and a second electrode; and
- a shisha device comprising:
  - a liquid cavity configured to contain a volume of liquid, the liquid cavity having a head space outlet;
  - an article cavity configured to receive the aerosol-forming article, the article cavity being in fluid communication with the liquid cavity; and
  - an oscillation circuit configured for connection to the first electrode and the second electrode,
- wherein the oscillation circuit is configured to supply a radio frequency (RF) alternating voltage to the first electrode and the second electrode, the RF voltage between the first electrode and the second electrode generating an alternating radio frequency (RF) electromagnetic field between the first electrode and the second electrode for heating the aerosol-forming substrate when the aerosol-generating article is received in the article cavity.

2. A shisha system as claimed in claim 1, wherein the first electrode and the second electrode are arranged to contact the aerosol-generating article when the aerosol-generating article is received in the article cavity.

3. A shisha system as claimed in claim 1, wherein the second electrode is spaced apart from the first electrode to receive at least a portion of the aerosol-forming substrate between the first electrode and the second electrode.

4. A shisha system as claimed in claim 1, wherein the shisha device comprises the first electrode and the second electrode, and the first electrode and the second electrode are arranged in or around the article cavity.

5. A shisha system as claimed in claim 1, wherein:
- the aerosol-generating article comprises the first electrode and the second electrode, at least a portion of the aerosol-forming substrate being disposed between the first electrode and the second electrode;
- the shisha device comprises a first electrical contact for electrically connecting the first electrode to the oscillation circuit; and
- the shisha device comprises a second electrical contact for electrically connecting the second electrode to the oscillation circuit.

6. A shisha system as claimed in claim 1, wherein:
- the shisha device comprises one of the first electrode and the second electrode;
- the aerosol-generating article comprises the other one of the first electrode and the second electrode; and
- the shisha device further comprises an electrical contact for electrically connecting the other one of the first electrode and the second electrode to the oscillation circuit.

7. A shisha system as claimed in claim 1, wherein one or more slots are formed in at least one of the first electrode and the second electrode.

8. A shisha system as claimed in claim 1, wherein the first electrode and the second electrode are substantially planar, and wherein the second electrode is arranged substantially parallel to the first electrode.

9. A shisha system as claimed in claim 1, wherein the first electrode is a tubular electrode, and wherein the second electrode is arranged within the tubular first electrode.

10. A shisha device comprising:
- a liquid cavity configured to contain a volume of liquid, the liquid cavity having a head space outlet;
- an article cavity for receiving an aerosol-generating article, the article cavity being in fluid communication with the liquid cavity;
- a first electrode and a second electrode, the first electrode and the second electrode being arranged in or around the article cavity; and
- an oscillation circuit connected to the first electrode and the second electrode and configured to supply a radio frequency (RF) alternating voltage to the first electrode and the second electrode, the RF voltage between the first electrode and the second electrode generating an alternating radio frequency (RF) electromagnetic field between the first electrode and the second electrode for heating the aerosol-forming substrate when the aerosol-generating article is received in the cavity between the first electrode and the second electrode.

11. A shisha device comprising:
- a liquid cavity configured to contain a volume of liquid, the liquid cavity having a head space outlet;
- an article cavity for receiving an aerosol-generating article, the article cavity being in fluid communication with the liquid cavity;
- a first electrode arranged in or around the article cavity;
- an electrical contact arranged in or around the article cavity for electrical connection to a second electrode, when an aerosol-generating article comprising a second electrode is received in the article cavity; and
- an oscillation circuit connected to the first electrode and the electrical contact and configured to supply a radio frequency (RF) alternating voltage to the first electrode and the electrical contact.

12. A shisha device comprising:
- a liquid cavity configured to contain a volume of liquid, the liquid cavity having a head space outlet;
- an article cavity for receiving an aerosol-generating article, the article cavity being in fluid communication with the liquid cavity;
- a first electrical contact arranged in or around the article cavity, and arranged for electrical connection to a first electrode received in the article cavity;
- a second electrical contact arranged in or around the article cavity, and arranged for electrical connection to a second electrode received in the article cavity; and
- an oscillation circuit connected to the first electrical contact and the second electrical contact, and configured to supply a radio frequency (RF) alternating voltage to the first electrical contact and the second electrical contact.

13. An aerosol-generating article for an electrically heated shisha system, the aerosol-generating article comprising:
- a first electrode and a second electrode spaced apart from the first electrode to form a substrate cavity; and
- an aerosol-forming substrate disposed in the substrate cavity, wherein the aerosol-forming substrate is a shisha substrate comprising at least about 20 percent by weight of sugar.

14. An aerosol-generating article as claimed in claim 13, wherein the first electrode and the second electrode are substantially planar, and the second electrode is arranged substantially parallel to the first electrode.

15. An aerosol-generating article as claimed in claim 13, wherein the first electrode is a tubular electrode and the second electrode is disposed within the first electrode.

16. An aerosol-generating article as claimed in claim 13, wherein one or more slots are formed in at least one of the first electrode and the second electrode.

* * * * *